(12) United States Patent
Yasuda et al.

(10) Patent No.: US 6,827,501 B2
(45) Date of Patent: Dec. 7, 2004

(54) OPTICAL COMMUNICATION PART AND METHOD OF FABRICATING THE SAME

(75) Inventors: Toshimichi Yasuda, Kitami (JP); Toshihiro Takimoto, Kitami (JP); Takayoshi Morooka, Kitami (JP)

(73) Assignee: Kyocera Corporation, Kyoto (JP)

(*) Notice: Subject to any disclaimer, the term of this patent is extended or adjusted under 35 U.S.C. 154(b) by 18 days.

(21) Appl. No.: 10/374,904

(22) Filed: Feb. 26, 2003

(65) Prior Publication Data

US 2003/0174974 A1 Sep. 18, 2003

(30) Foreign Application Priority Data

| Feb. 27, 2002 | (JP) | P 2002-052248 |
| Feb. 27, 2002 | (JP) | P 2002-052368 |
| Mar. 27, 2002 | (JP) | P 2002-089444 |
| Nov. 27, 2002 | (JP) | P 2002-344741 |

(51) Int. Cl.$^7$ .............................. G02B 6/36
(52) U.S. Cl. ............................ 385/80; 385/88
(58) Field of Search ................ 385/80, 88, 58, 385/70, 77, 94

(56) References Cited

U.S. PATENT DOCUMENTS 5,661,832 A * 8/1997 Yonemura .............. 385/88
RE36,231 E * 6/1999 Rondeau ................ 385/81
6,283,643 B1 9/2001 Serizawa

FOREIGN PATENT DOCUMENTS

| JP | 02-262607 | 10/1990 |
| JP | 2001-290049 | 10/2001 |

* cited by examiner

Primary Examiner—Chandrika Prasad
(74) Attorney, Agent, or Firm—Hogan & Hartson LLP

(57) ABSTRACT

To provide a fabricating method of an optical communication part in which an optical element is fixed within a hollow holder, including the step of fixing an optical element by holding the optical element in a hollow portion of a holding portion of a metal made holder and calking a portion of the holder; wherein, the step includes calking the holder by heating the holder to a temperature higher than a operating temperature or cooling the holder to a temperature lower than the operating temperature depending on whether or not a thermal expansion coefficient of the holder is larger or smaller than that of the optical element. When the thermal expansion coefficient of the holder is larger than that of the optical element, and a heating temperature in calking is set within the range of 85° C. to 95° C., while when the thermal expansion coefficient of the holder is larger than that of the optical element the cooling temperature of the holder upon the calking is set within the range of −50° C. to −40° C.

6 Claims, 17 Drawing Sheets

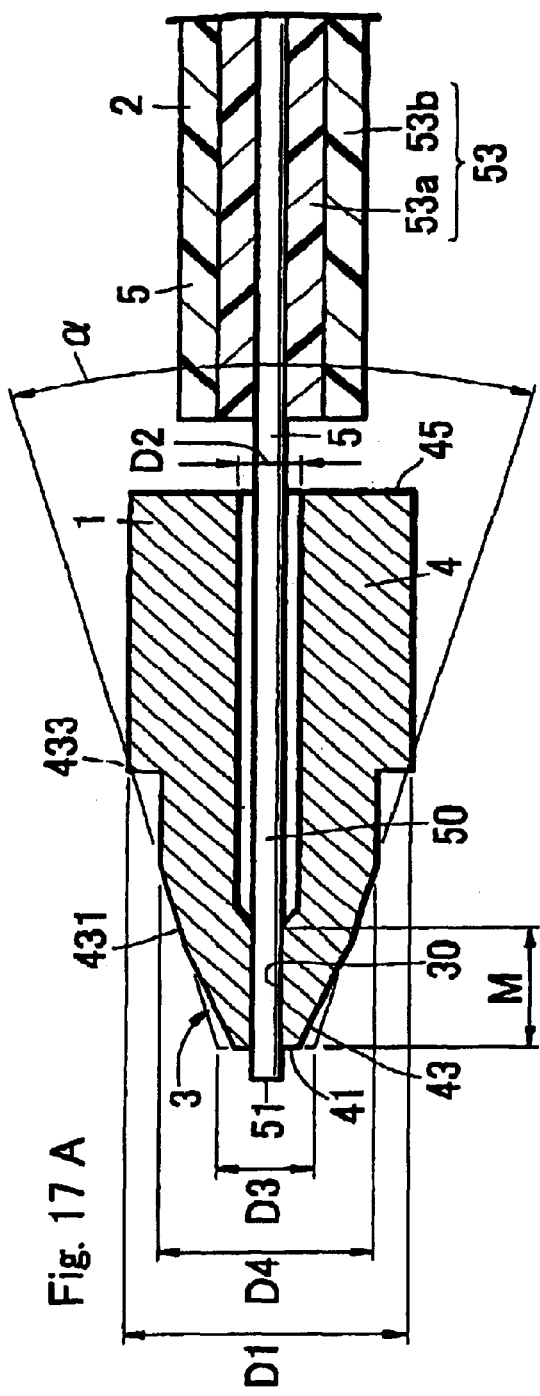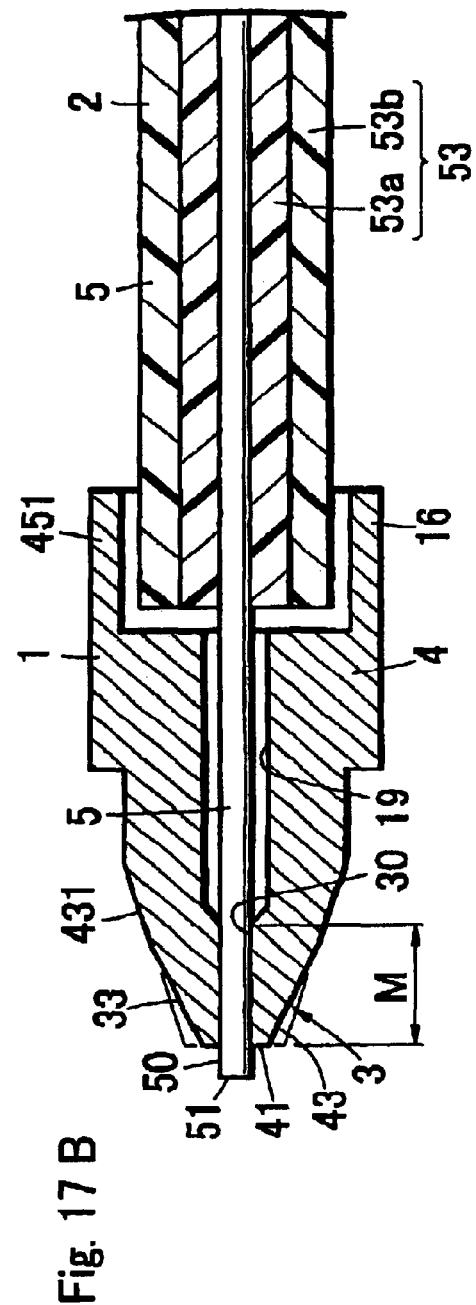
Fig. 17 A
Fig. 17 B

OPTICAL COMMUNICATION PART AND METHOD OF FABRICATING THE SAME

BACKGROUND OF THE INVENTION

1. Field of the Invention

The present invention relates to an optical comunication part including an optical element and a holder which calks the element therein. The present invention relates to a fabricating method of an optical communication part having an optical element fixed by caking in a hollow portion of a holder.

2. Prior Art

Some optical communication part are used with optical elements fixed within hollow holders. Such parts include optical communication equipment, measuring apparatuses, optical sensors and laser devices and the like, and further, such optical elements may include lenses, mirror reflectors, waveguides, optical isolators, and optical fibers or the like. Mechanical properties, for example, tensile strength, air-tightness and solder wettability are required for the above described parts.

According to a conventional art, in the optical communication equipment many optical communication parts have been used with optical elements fixed by calking in holders or ferrules. For example, Japanese Patent Publication No. 2-262607 discloses a method for calking a cylindrical lens within a holder.

However, it may be not sufficient that the optical element is fixed within the holder without using a curable bond material but only by using calking. For example, in the case where a spherical lens and a holder have different thermal expansion coefficients, even at a temperature when using an apparatus, a gap may be formed between the lens and the holder. This involves such a defect that the lens is deviated out of position, which doses not provide a desired optical property.

Japanese Patent Publication No. 2001-290049 discloses an optical communication part having an optical fiber fixed by calking to a ferrule which is shaped in a cylinder of a metal material plastically deformable and mechanically machinable by processing such as cutting. In FIG. 22A, within the ferrule, a glass fiber in an optical fiber 127 made of quartz glass from which a two-layered coating 128 has been removed in advance is inserted in the ferrule, and part of an outside of the ferrule 125 is deformed by adding compression from the outside toward a center thereof to calk the glass fiber 127 directly.

U.S. Pat. Re. No. 36231, as shown in FIG. 22B, discloses a structure in which the shapes of an optical fiber 126 and the ferrule 125 to be used are the same as that of FIG. 22A, except that upon fixing by calking a front end of the ferrule 125 is pushed in an axial direction by a upsetting die 129 having a tapered inner surface, resulting in the front end 134 of the ferrule 125 to be deformed in a tapered form to calk the optical fiber core 127 directly therein.

On the other hand, a structure is also suggested to fix by calking the optical fiber in the ferrule with a buffer material interposed between the ferrule 125 on the inside and the fiber core 127 to be calked. In a structure shown in FIG. 22C as an example of the above, at first, a coating 128 at the front end portion of an optical fiber 126 is removed, and then, the exposed optical fiber core 127 is inserted through the ferrule 125. Japanese Patent Publication No. 2000-304968 discloses that a ferrule 125 is formed in a stepped form which is provided with a fiber core insertion hole 130 having inserted therethrough the fiber core 127 and with a coating insertion hole 131 having inserted therethrough a first coating 128a of the optical fiber 126. This structure is further provided with a coating calk portion 32 for calking the first coating 128a, and the optical fiber 126 is fixed via the first coating 128a by deforming the coating calk portion 132.

FIG. 22D shows that the coating 128 is compressed between the back end of the ferrule and the optical fiber in addition to fixing by the direct calking of the fiber core 127 at the front end of the ferrule as shown in FIG. 22B. At first, in the same manner as the above, the fiber core 127 from which the coating 128 has been removed in advance is inserted through the stepped-formed ferrule 125 and through a core insertion hole 130 at the front end of the ferrule and the coating is inserted through a coating insertion hole 131 at a rear end of the ferrule, after which the front end 134 around the fiber core and the rear end 135 of the ferrule 125 covering the coating 128 are calked respectively.

In the conventional techniques, as described above, a ferrule and a fiber core of optical fiber were directly calked, and, in calking, the outside of the ferrule was locally pressurized. However, it was very difficult in substance to deform the ferrule 125 uniformly by the force from its outer periphery. Even if the optical fiber 126 could be fixed to the ferrule, a gap was often formed between the ferrule and the fiber core which cannot ensure airtightness therebetween. On the contrary, where a calking amount is increased to secure airtightness, a crack tends to be generated in the fiber core by a calking strain directly produced thereto.

In the case of the structure as shown in FIG. 22B, it was possible to deform the front end of the ferrule 125 by the upsetting die 129 having a tapered inner shape, achieving airtightness easily, but a stress tended to be concentrated only on the front end 134 when the ferrule 125 was calked by the upsetting die 129, because the front end face of the ferrule 125 before calking was flattened at right angle to the periphery of the ferrule. Accordingly, the deformation amount of the ferrule 125 must be very minute, and the calked length 133 in FIG. 22B was not more than 0.1 mm, decreasing strength against tension between the ferrule 125 and the optical fiber 126.

Since the cross section of the front end 34 of the ferrule 125 was shaped flat, a friction force (contact resistance) against the die was so large when pressing the die 129 to the ferrule 125 that a force was not effectively transmitted in a direction toward an axis of the ferrule for calking the fiber core 127, with the ferrule 125 stressed along the axis thereof, resulting in an external diameter of the ferrule 125 to be expanded. Where the external diameter of the ferrule 125 was expanded, in installing the optical part in communication equipment, an optic axis thereof was deviated from that of its counterparts, preventing the parts from optical connecting.

In the next place, in the case of the structure as shown in FIG. 22C, when installed the part in communication equipment, the part was fixed to the other part mainly by soldering or YAG laser welding in which a high temperature was provided to the coating 28a through the ferrule 125 and the coating 128a sometimes melted to drop out the optical fiber 126 therefrom.

Because the coating 128a was of synthetic resin such as polyacrylate or polyvinyl chloride, the coating had a negative impact on the peripheral parts due to outgassing from the coating 128a in communication equipment in which the part was installed. In addition, the coating 128a was easily deteriorated by absorption of water at a high temperature and a high humidity, and was expanded or contracted due to the temperature change, the optical parts having a problem of lowering of strength and reliability to the parts. Further, variation of thickness in the coating 128a changed a gripping force after calking, which makes strength unstable.

In the structure as shown in FIG. 22D, although airtightness was ensured by directly calking the optical fiber core 127 at the front end 134 of the ferrule 125 and the tensile strength at the front end side was compensated by calking the coating 28 at the rear end 135 of the ferrule 125, when installing the optical part in communication equipment the coating 128 melted by heat in soldering or YAG laser welding in the same manner as the above described disadvantage and therefore the tensile strength of the optical fiber 26 was not secured.

SUMMARY OF THE INVENTION

The present invention has been made taking the foregoing problems into account. An object of the present invention is to provide a method for fabricating an optical communication part capable of stable calking of a holder to an optical element to effectively prevent the calked part from loosing.

Another object of the present invention is to provide a method for fabricating an optical communication part capable of being held by calking a holder certainly and uniformly to an optical element with a high reliability in strength and airtightness.

Still another object of the present invention is to provide a method for fabricating an optical communication part in which the holder is provided with a calking portion for holding a coating around the optical element, the calking portion being provided with a strong fastening force and a thermal stability.

Further another object of the present invention is to provide an optical communication part including an optical element and a hollow holder to fixing the optical element within a hollow portion thereof by calking the periphery of the hollow portion to exhibit good performances required for the optical communication parts.

The method of fabricating an optical communication part according to the present invention includes the steps of fixing an optical element in a hollow portion of a holder made of metal by calking the hollow portion of the holder, wherein the calking step include calking the holder by heating the holder to a temperature higher or cooling the holder to a temperature lower than the operating temperature of the communication part depending on whether a thermal expansion coefficient of the holder is higher or lower than that of the optical element. The part so fabricated has no gap generated between the optical element and the holder even if they are used within the operating temperature range, acquiring a desired optical property.

More in detail, when a thermal expansion coefficient of the holder is higher than that of the optical element, holding the optical element by a holding portion of the holder, the holder may be calked on the optical ellemment at a higher temperature than the operating temperature of the optical communication part. On the other hand, when the thermal expansion coefficient of the holder is lower than that of the optical element, by holding this optical element by the holding portion of the holder, the holder is calked to the optical element at a lower temperature than the operating temperature of the optical communication part. In many cases, the operating temperature of the part may be in the range of −40° C. to +80° C. Further, the higher temperature in heating the holder and optical element is determined within the range of +85° C. to +95° C. and a lower temperature in cooling the holder and optical element when the part is fixed may be determined within the range of −50° C. to −40° C. When such a difference of the thermal expansion coefficient and such a range of the calking temperature can be set, the calking stress against the optical element of the holder is appropriately remained to fix the optical element at a room temperature and the operating temperature. Then it is possible to prevent the optical element from falling or dropping out of the holder, and preventing deviation of the optical axis of the optical element due to loosening the element within the holder.

A method for fixing a part by transforming the holder from the outer peripheral portion thereof toward a center of the optical element may be adopted to the above described calking. The holder may directly calk the optical fiber and the optical fiber may be calked with the coating provided to the optical fiber or the outer peripheral portion of a buffer portion provided for an outer periphery of the optical fiber or an inner follow portion of the holder.

In the fabricating method of the present invention, the optical element may include an optical fiber and a projection length of the optical fiber from a calking region where the inner surface of the holder joins the optical fiber with pressure to the front end side of the holder is defined as 1 mm or less.

According to the fabricating method of the present invention, a positioning mark may attached to the holder, and according to the calking step, a front end of the optical fiber is formed at a certain angle or at a certain position with respect to the positioning mark.

According to the fabricating method of the present invention, it in preferable that the holder may include a hollow holder body made of metal and a metal buffer layer, which is joined to the inside of the holder body through a diffusion layer.

According to the fabricating method of the present invention, it is preferable that an optical element comprises an optical fiber, and a contact length of an optical fiber in an axis direction at a calking region, to which the inner surface of the holder joins the optical fiber with pressure, is set to be 0.1 mm or more.

BRIEF DESCRIPTION OF THE DRAWINGS

The detailed description of the present invention will be given below with reference to the attached drawings.

FIGS. 17A and 17B are cross sectional views of the optical communication part by using the optical fiber according to the another embodiment of the present invention, respectively;

DESCRIPTION OF THE PREFERRED EMBODIMENTS

Figure 1:
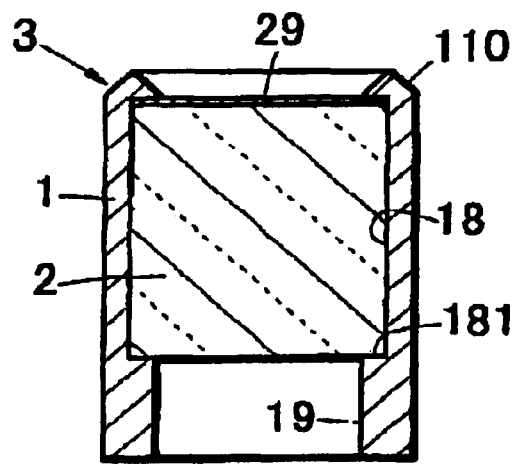
FIG. 1A is a cross sectional view of an optical communication part according to an embodiment of the present invention.
FIG. 1B is a cross sectional view of a holder used for the embodiment of the present invention.
FIG. 1C is a perspective view of a holder according to another embodiment of the present invention.
Figure 1:
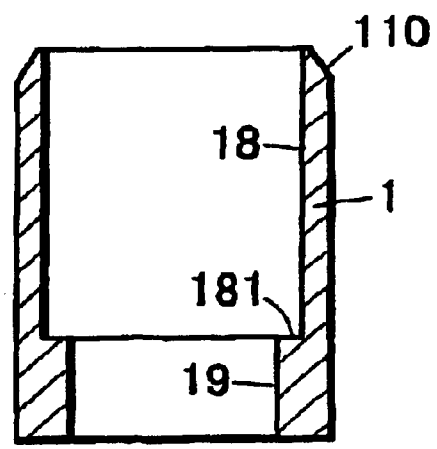
Figure 1:
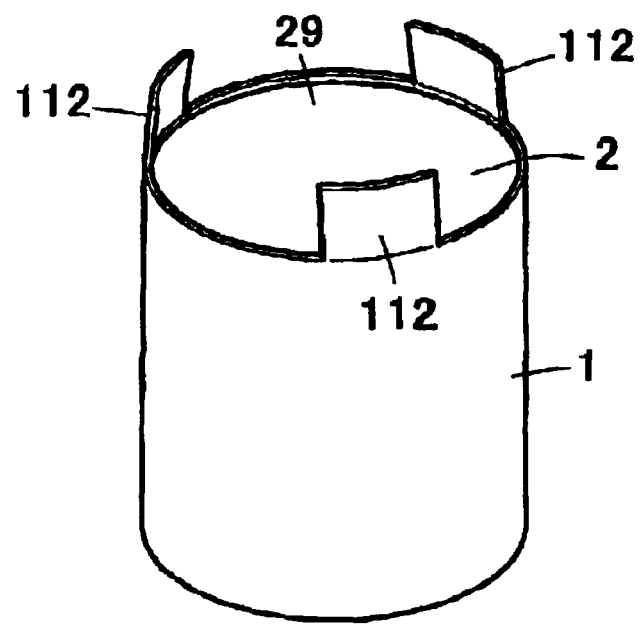

According to the present invention, a holder has a hollow body or an annular body made of metal having a hollow portion, and an optical element is inserted within the hollow portion of the body. Then, a front end portion of this metal body or an outer periphery thereof is locally transformed by calking processing and the inner periphery of the body is also transformed, so that this transformed inner periphery of the body pushes the outer periphery of the optical element to fix the optical element to the hollow portion.

The optical element may include an optical part capable of being inserted within the hollow portion of the holder and being fixed thereto. For example, the optical element may include a light emitting element, a laser oscillation element, a lens, a mirror reflector, a prism, a light polarizer, a double refraction crystal, a half-wave plate, a quarter-wave plate, a beam splitter, and an optical fiber. Further, the optical element may include an optical element comprising a combination of these, for example, an optical isolator, a collimator, an interference device, an optical guide, and an optical coupler.

Particularly, when the optical element comprises an optical fiber, the holder may be refereed to as a ferrule. The optical fiber may include a single mode fiber, a multi mode fiber, and a polarization-maintaining fiber or the like. As these fibers, a quartz glass and other optical glass are utilized.

The optical fiber is dedicated for communication and its clad fiber and an unclad fiber, and generally, the optical fiber is based on an International Standard of IEC60793-2 and has a fiber diameter of 125 $\mu$m.

Another holder in a tubular or annular shape has a hollow portion and a front end portion of its outer periphery or its outer periphery is processed by calking. A material to be used for the holder may be selected from materials rich in toughness and workability. For example, the material may include copper, aluminum, magnesium, or an alloy of these metals, an iron-chrome alloy, an iron-nickel-chrome alloy (for example, an austenitic stainless steel), and an iron-nickel alloy (for example, Kovar) or the like. The material is generally preferable to have a low thermal expansion coefficient as described later.

An optical communication part according to the present invention is assembled in such a manner that an optical part is inserted at a certain position of a hollow portion of a holder having a hollow or tubular body and the optical part is fixed by externally calking the body.

First Embodiment

According to the present embodiment, in a calking step, a holder made of a metal having a higher thermal expansion coefficient than that of the optical element is calked as the calking temperature remains higher than the operating temperature limit. Normally, prior to calking, the holder and the optical element are heated to the calking temperature higher than the operating temperature and then, they are calked. Subsequently, they are cooled to an external temperature after calking.

On the other hand, a holder made of a metal having a lower thermal expansion coefficient than that of the optical element is calked as the calking temperature remains lower than the operating temperature limit. Normally, prior to calking, the holder and the optical element are cooled to the calking temperature as same as the above case. Subsequently, they are left in the air to be cooled to a room temperature after calking.

In this case, the operating temperature is preferably within a temperature range that a property as the optical communication part is secured and that may be attained when storing and transporting the produces. In the optical communication part, this operating temperature is generally in the range of −40° C. to +85° C.

In the case of heating the temperature of the holder and the optical element, this operating temperature is preferably in the range of the upper limit to the upper limit +10° C., and in the case of cooling them, this operating temperature is preferably in the range of the lower limit to the lower limit −10° C. If the calking process is carried out at a temperature far off from the operating temperature limit, when they are returned to the room temperature, it is feared that the stress is left in the holder and the optical element more than necessary to break down them.

In the case of raising the temperature or the holder upon calking, the temperature upon calking is preferably in the range of 85° C. to 95° C., and on the other hand, in the case of cooling the holder upon calking, the temperature upon calking is preferably in the range of 50° C. to −40° C.

The difference of the thermal expansion coefficient between the optical element 2 and the holder 1 is preferably within $5\times10^{-6}$/K, particularly, in a range of $1\times10^{-6}$/K to $5\times10^{-6}$/K because if they are fixed by calking by using materials having a large difference between their thermal expansion coefficients a thermal stress more than necessary acts on the optical element 2, causing a crack in either of the material.

Table 1 lists materials available for a main optical element and a holder and their thermal expansion coefficients.

TABLE 1

| Material | Thermal expansion coefficient (×10$^{-6}$/K) |
| --- | --- |
| Quarts glass | 0.55 |
| BK7 glass | 7.1 |
| 42% Ni—Fe alloy | 4.9 |
| Kovar | 5.0 |
| 45% Ni—Fe alloy | 7.0 |
| 50% Ni—Fe alloy | 9.7 |
| SF20T | 11.0 |

Particularly, in a structure of optical parts in which the optical fiber is fixed to a holder, quarts glass for material of the optical fiber has a thermal expansion coefficient as small as $0.55\times10^{-6}$/K so that the holder may preferably be an alloy having a small thermal expansion coefficient, such as, for example, F15 in ASTM having a level of $5.0\times10^{-6}$/K.

FIG. 1A is an example of an optical communication part and shows a mirror in which a glass disc with a reflective surface is embedded as the optical element 2 in the front end portion of the tubular holder 1. FIG. 1B shows a cross sectional view of the holder and the holder 1 comprises a larger diameter portion 18 having an internal diameter nearly same as an external diameter of the optical element 2 and a smaller diameter portion 19 having an internal diameter smaller than an internal diameter of this larger diameter portion 18. Further, within the holder, a stepped surface 181 is provided between the larger diameter portion 18 and the smaller diameter portion 19, and the length of the larger diameter portion 18 substantially conforms with the length of the cylindrical optical element 2.

In FIG. 1A, upon fixing the optical element 2, the optical element 2 is inserted in the larger diameter portion 18 so as to strike the optical element 2 against the stepped surface 181, and then, a thin-walled portion 110 at an opening end side of the larger diameter portion 18 is bent to the inside 90 degrees and over to be fixed by calking.

As shown in FIG. 1(B), a condition before assembly of the holder 1, the stepped surface 181 is provided at a boundary between the larger diameter portion 18 and the smaller diameter portion 19, and the thin-walled portion 110, of which external diameter is processed in a taper shape of about 45 degrees to be thinned, is continuously formed at an opening end side of the larger diameter portion 18.

In the optical element 2, at least a portion of a flat surface at its incident side end face and its exit side end face is sandwiched by the stepped surface 181 and the thin-wall portion 110, which is bent 90 degrees and over by calking.

In the case that the thermal expansion coefficient of the holder 1 is larger than that of the optical element 2, the operating temperature limit is lower than the temperature upon calking, so that the contraction of the holder 1 is larger than that of the optical element 2 and the force that the holder 1 clips the optical element 2 is definitely generated.

In addition, in the case that the thermal expansion coefficient of the holder 1 is smaller than that of the optical element 2, the operating temperature limit is higher than the temperature upon calking, so that the contraction of the holder 1 is smaller than that of the optical element 2 and the force that the holder 1 clips the optical element 2 is definitely generated. Therefore, even if a thermal expansion and contraction Are generated in the optical element 2 and the holder 1 within the operating temperature range, a gap is not generated between the holder 1 and the optical element 2. As a result, the optical element 2 is not deviated and a desirable optical property may be obtained. In addition, in the case of shrinkage fit, it is needed to strictly control a common difference between the external diameter of the optical element 2 and the internal diameter of the holder 1, however, according to this method, there is no need to strictly control the common difference, and further, this method may also cope with the holder 1 having a complex structure.

In addition, the holder is capable of being calked by a face contact of the full periphery. It is possible to disperse the force to be added to the optical element 2, so that the breakdown of the optical element 2 may be prevented.

However, a portion 3 is not necessarily calked across the full periphery of the thin-wall portion 110, so that a partial calking with a partial calking portion 112 provided at some positions may be adopted. The holder according to this example is shown in FIG. 1C. Such partial fixation by calking enables the load provided to the optical element 2 to be reduced as compared to the fixation across the full periphery of the thin-wall portion 110. Further, this enables the optical element 2 having a complex structure, in which the flat face is located at only a small portion of the incident side end face and the exit side end face, to be fixed.

Figure 2:
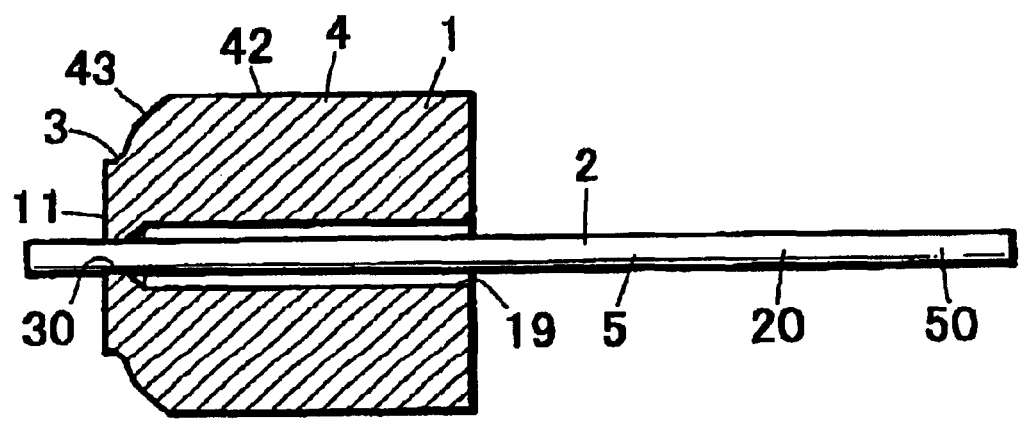
FIG. 2 is a cross sectional view of the optical communication part for fixing an optical fiber according to another embodiment of the present invention.

FIG. 2 shows a fabricating method according to another embodiment. In this example, an optical fiber 5 as the optical element 2 is fixed to a ferrule 4 as the holder 1.

The internal diameter of the ferrule 4 is rather larger than the external diameter of the optical fiber 5, and the optical fiber 5 is inserted into the ferrule 4 and then, it is fixed to the ferrule 4 by calking the outer periphery of a holder front end portion 11.

Upon the calking process, in the case that the thermal expansion coefficient of a metal material of the ferrule 4 is higher than that of the thermal, expansion coefficient of the optical fiber 5, the optical fiber 5 and the ferrule 4 are heated to a temperature higher than the operating temperature limit. In addition, in the case that the thermal expansion coefficient of a metal material of the ferrule 4 is lower than that of the thermal expansion coefficient of the optical fiber 5, the calking process is carried out at a temperature lower than the operating temperature limit.

Figure 3:
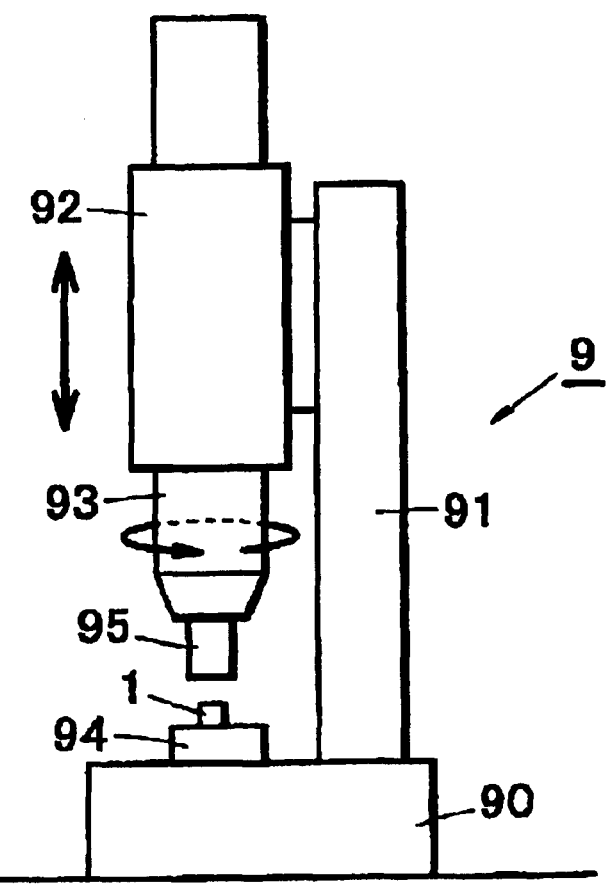
FIG. 3 is a schematic view of a calking apparatus used for a fabricating method according to the embodiment of the present invention.

In the next place, a fabricating method of the communication part according to the above described configuration will be described below with reference to the drawings. According to the present invention, it is possible to use a calking processing machine 9 as shown in FIG. 3.

Figure 4:
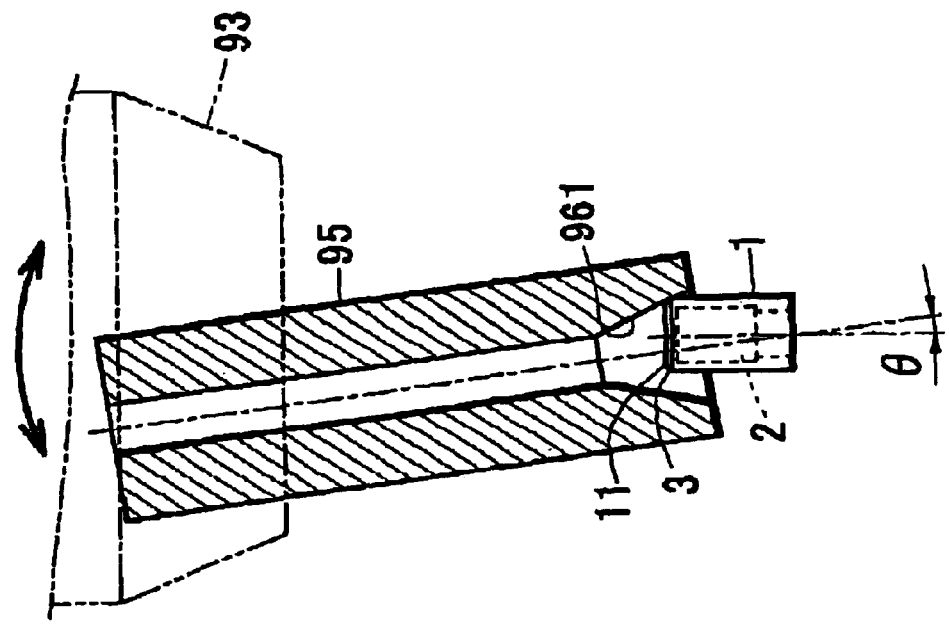
FIG. 4A is a cross sectional view of a calking jig used for the calking apparatus shown in FIG. 3.
FIG. 4B is a partial cross sectional view for showing the operation of the calking jig shown in FIG. 4A, which is fixed to the calking apparatus shown in FIG. 3.
Figure 4:
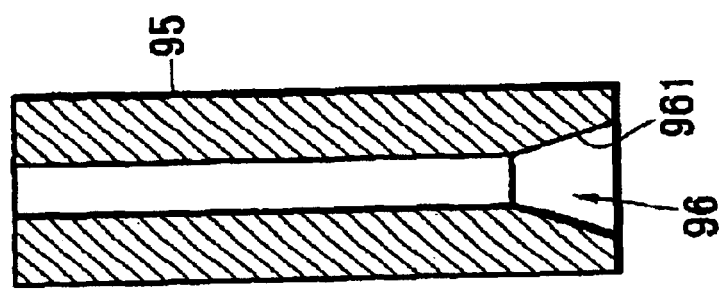

The calking processing machine 9 is provided with a temperature regulator 94, which is fixed on table 90, and further, a lifting device 92 along a supporting body 91 is provided with a processing jig 95 for calking at a front end of a lifting shaft 93 as a rotation mechanism. FIG. 4A shows an example of a structure of the processing jig 95. The front end of the processing jig 95 has an opening portion 96 and the opening portion 96 has a processed face 961 in a taper shape, in which an inner wall of the opening portion 96 extends toward a release end in about 45 degrees.

The holder 1 is fixed on the temperature regulator 94 toward the front end of the holder 1 together with the above described optical element 2. The temperature regulator 94 may include a heating element, for example, an electric heater or a cooling element to heat or cool the holder 1 and the optical element 2. It is also possible to change over heating and cooling by using a thermoelectric element (such as a peltiert element) for the temperature regulator 94.

In FIGS. 4A and 4B, upon calking, the opening portion 96 of the processing jig 95 abuts against an upper end of the holder 11 and the processing jig 95 is rotated by the rotation mechanism with pressurized by a load of 50 g to 1,000 g under the circumstance that the opening portion 96 of the processing jig 95 contacts the thin-walled portion 110 of the holder 1. Due to the swing of the processing jig 95 along the calking portion of the holder 1, as shown in FIG. 1A, the thin-walled portion 110 is bent 90 degrees and over toward the inside to press the upper edge and the upper end face of the optical element 2 by a face contact, so that the optical element is fixed within the holder.

Upon this calking, as described above, the temperature regulator 94 controls the temperature of the optical element 2 and the holder 1 so as to be higher or lower than the operating temperature limit in accordance with the difference of the thermal expansion coefficient limit.

The temperature regulator 94 may be a supply equipment of a hot air and a cold air. Further, the temperature regulator 94 may control the temperature by irradiating the light by means of a halogen lamp or the like.

Figure 5:
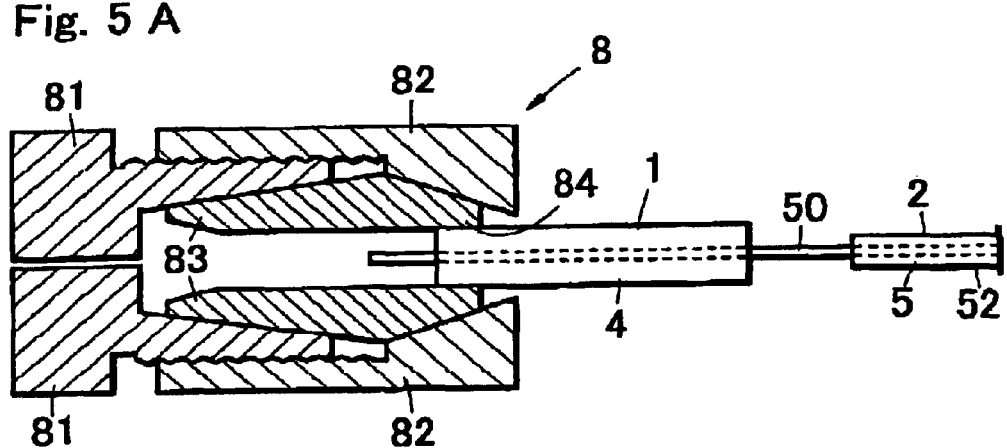
FIGS. 5A and 5B are cross sectional views of an apparatus for showing the schematic operation of the calking in another calking apparatus used for another embodiment of the present invention.
FIG. 5C is a cross sectional view of the optical communication part including an optical fiber calked by apparatus shown in FIG. 5A and FIG. 5B.
Figure 5:
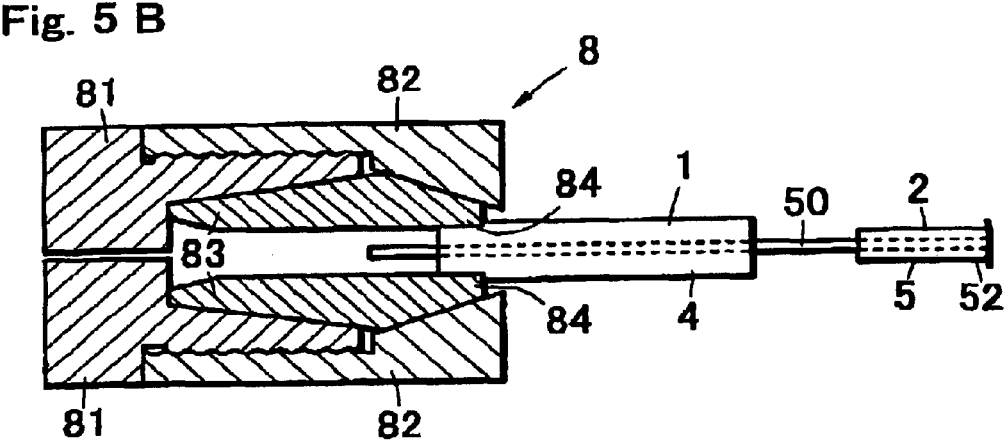
Figure 5:
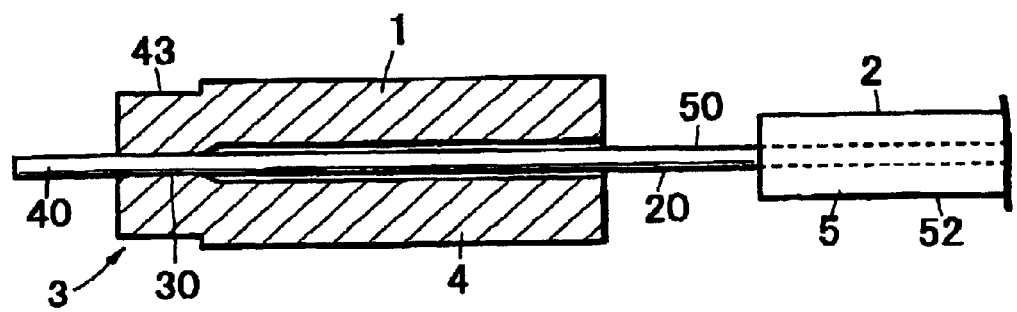

With respect to a fabricating method according to another embodiment, another calking step will be shown below to fix the optical fiber 5 to the ferrule 4. In FIG. 5A, the ferrule 4 having inserted therebetween the optical fiber 5 is set to a fastened portion 84 of the jig. By rotating and fastening a pressed portion 83 attached to a fixed portion 82 of a collet 83, the internal diameter of the fastened portion 84 of the collet 83 becomes small, the ferrule 4 contacting the fastened portion 84 as shown in FIG. 5B is transformed, and the inserted optical fiber 5 is fixed in the ferrule 4 as shown in FIG. 5C.

Figure 6:
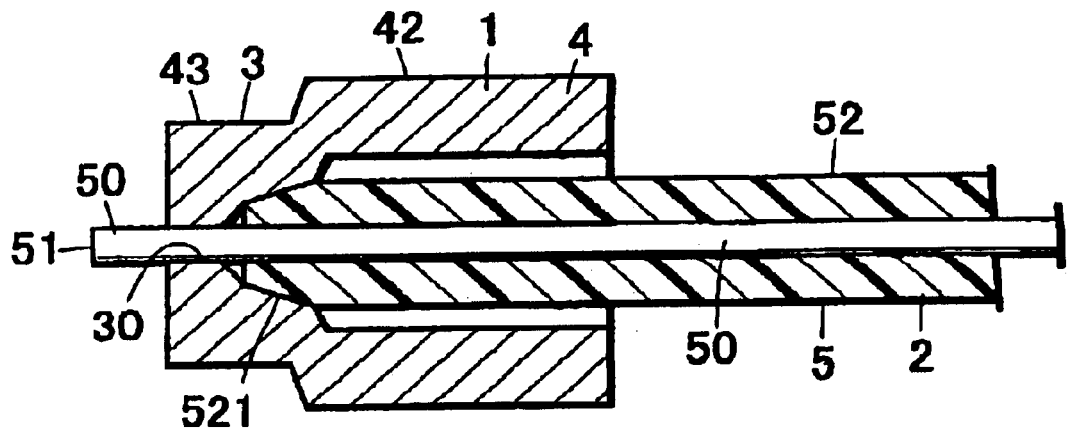
FIG. 6 is a cross sectional view of the optical communication part comprising an optical fiber and a ferrule according to another embodiment of the present invention.

FIG. 6 shows another embodiment according to the present invention. In FIG. 2, only the optical fiber 5 is fixed due to the transformation of the ferrule 4, however, as shown in FIG. 6, not only a fiber core 50 but also a diameter contraction calking portion 43 is formed at the outer periphery of the end portion of the ferrule 4, so that a front end outer periphery portion 521 of an optical fiber coating 52 may be fixed. Thus, this optical fiber coating 52 serves as a buffer portion and an area of the calking-fixed portion is increased, so that the tensile strength of the fiber becomes stronger.

Figure 7:
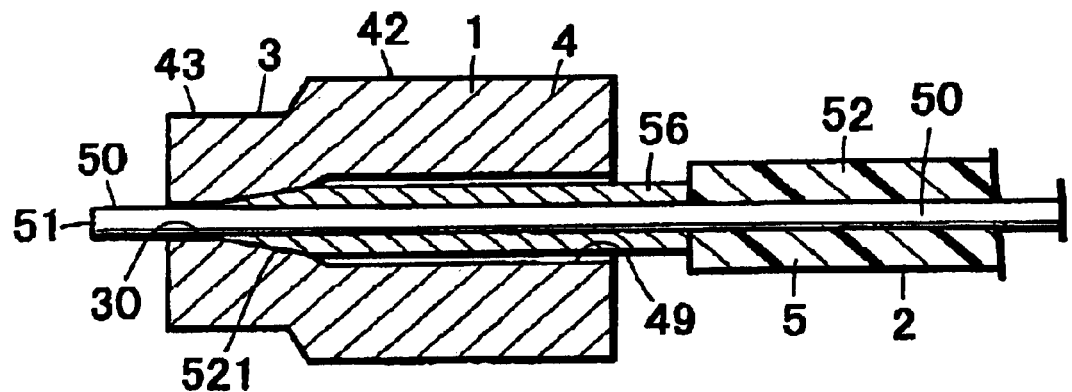
FIG. 7 is a cross sectional view of the optical communication part comprising the optical fiber and the ferrule according to still another embodiment of the present invention.
Figure 8:
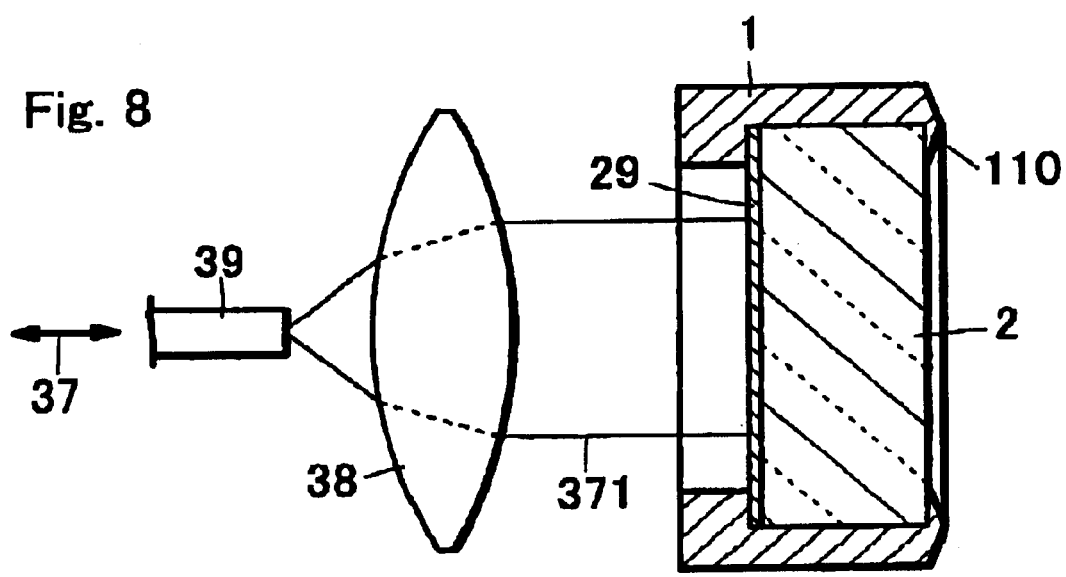
FIG. 8 is a schematic view of an experimental optical system for optically detecting the deviation of the optical communication part that is manufactured according to a fabricating method according to the embodiment of the present invention.

In addition, FIG. 7 shows that, in place of the optical fiber coating 52 shown in FIG. 6, a buffer portion 56 is provided at the outer periphery of the optical fiber 5 in a calking portion 30 where the calking-fixation is carried out. When this buffer portion 56 is fixed by transformation of the ferrule 4, the fiber tensile strength thereof becomes stronger as same as FIG. 6. This buffer portion 56 may be made of a polymer material having a heat resistance, for example, a fluorocarbon resin, whereby the buffer portion 56 is prevented from being melted by the heat generated when soldering this ferrule 4 to other package. A tube of a polymer may be put through the optical fiber 5 or the polymer may be directly coated so as to be an optical fiber.

FIRST EXAMPLE

According to the present example, in the embodiment of the holder 1 shown in FIG. 1, it was inspected whether or not the optical element 2 is deviated before and after a temperature cycle test. The test has been carried out by an optical systems test equipment shown in FIG. 9B.

A BK7 glass with thickness 0.5 mm (a thermal expansion coefficient $7.1 \times 10^{-6}$/K) was formed into the optical element 2, which is shaped in a cylinder with a diameter of 1.4 mm. This optical element 2 was provided with a metal deposited reflection plate 28 on a surface thereof.

Stainless steel SF20T (a thermal expansion coefficient $11.0 \times 10^{-6}$/K) was formed into the holder 1 of an annular body with an external diameter 3 mm, a thickness 0.5 mm, an internal diameter 1.41 mm of the larger diameter portion 18, an internal diameter 1.25 mm of the smaller diameter portion 19, a taper angle 45 degrees of the thin-walled portion 110, and a length of 0.1 mm. At a load of 500 g, the temperature upon calking are set to be 25° C. to 90° C.

As shown in FIG. 6, the test equipment has a collimate lens 30 for forming a light 31 from the optical fiber 29 into a collimate light. Then, the collimate light was inputted in the reflection plate 28 of the optical element 2 and this reflection light was returned to the optical fiber 29 through the lens 30. The test was carried out in 100-cycles to heat and cool this entire optical system repeatedly within the temperature range of −40° C. to +85° C. Before and after this test, the amount of return light was measured and its light variation was evaluated. The test results are shown in Table 2.

TABLE 2

| | Variation of reflected light; dB | | | |
|---|---|---|---|---|
| | Example 1 Temperature in calking | | Example 2 Temperature in calking | |
| No. | 25° C. | 90° C. | 25° C. | −45° C. |
| 1 | 0.00 | 0.02 | 0.02 | 0.00 |
| 2 | 0.05 | 0.01 | 0.03 | 0.00 |
| 3 | 0.04 | 0.01 | 0.00 | 0.03 |
| 4 | 0.04 | 0.03 | 0.04 | 0.02 |
| 5 | 0.02 | 0.01 | 0.06 | 0.01 |
| 6 | 0.01 | 0.00 | 0.01 | 0.01 |
| 7 | 0.04 | 0.02 | 0.04 | 0.01 |
| 8 | 0.05 | 0.02 | 0.03 | 0.01 |
| 9 | 0.05 | 0.01 | 0.05 | 0.02 |
| 10 | 0.07 | 0.02 | 0.00 | 0.01 |
| 11 | 0.03 | 0.00 | 0.02 | 0.00 |
| Maximum | 0.07 | 0.03 | 0.06 | 0.03 |
| Minimum | 0.00 | 0.00 | 0.00 | 0.00 |
| Average | 0.036 | 0.014 | 0.027 | 0.011 |

In a sample that is fixed by calking at 25° C., the variation of reflection return light is 0.036 dB on the average, and 0.07 dB at the maximum. Further, in a sample that is fixed by calking at 90° C., the variation of reflection return light is 0.014 dB on the average, and 0.3 dB at the maximum. Therefore, in the sample that is fixed by calking at 90° C., the variation of reflection return light is less than half that of the sample that is fixed by calking at 25° C. on the average and at the maximum. This result indicates that there is a less deviation with respect to the holder 1 of the optical element 2.

SECOND EXAMPLE

According to the present example, as same as the former first example, a BK7 glass with thickness 0.5 mm (a thermal expansion coefficient $7.1\times10^{-6}$/K) was formed into the optical element 2, which is shaped in a cylinder with a diameter of 1.4 mm. This optical element 2 was provided with a metal deposited reflection plate 28 on a surface thereof.

Differently from the first example, a ASTM-F15 (a thermal expansion coefficient $5.0\times10^{-6}$/K) was formed into the holder 1 of an annular body with an external diameter 3 mm, a thickness 0.5 mm, an internal diameter 1.41 mm of the larger internal diameter portion 18, an internal diameter 1.25 mm of the smaller internal diameter portion 19, a taper angle 45 degrees of the thin-walled portion 110, and a length of 0.1 mm. At a load of 500 g, the temperature upon calking are set to be +25° C. and −45° C.

As same as the first example, the test was carried out in 100-cycles to heat and cool this entire optical part shown in FIG. 6 repeatedly within the temperature range of −40° C. to +85° C. Before and after this test, the variation of return light was measured.

This measurement result is as shown in Table 2. In a sample that is fixed by calking at 25° C., the variation of reflection return light is 0.027 dB on the average, and 0.06 dB at the maximum. Further, in a sample that is fixed by calked at −45° C., the variation of reflection return light is 0.011 dB on the average, and 0.03 dB at the maximum. Therefore, as same as the first example, in the sample that is fixed by calking at −45° C., the variation of reflection return light is less than half that of the sample that is fixed by calking at 25° C. on the average and at the maximum. This result indicates that there is a less deviation with respect to the holder 1 of the optical element 2.

In addition, in third example, in a sample that an optical fiber shown in FIG. 5C, which is manufactured by calking methods shown in FIGS. 5A and 5B, is fixed to the holder and a sample which is manufactured by the configurations shown in FIG. 6 and FIG. 7, the tensile strength was measured.

The calking-fixation was carried out at a room temperature. As the holder, the ASTM F15 of a length 6 mm and an external diameter 1 mm was used. The optical fiber coating was made of a vinyl chloride with a thickness 0.39 mm and the buffer portion was coated with a Teflon with a thickness 0.1 mm. In addition, in any samples, the test was carried out under the condition that the length of the calking-fixed portion 30 of the optical fiber was in the range of 0.15 to 0.2 mm, the length of the calking-fixed portion 30 of the optical fiber coating was in the range of 0.5 to 0.7 mm, and the length of the calking-fixed portion 521 of the buffer portion was in the range of 0.3 to 0.5 mm. This result was shown in Table 3.

TABLE 3

| | Fiber tensile strength: kgf | | |
|---|---|---|---|
| No. | Optical fiber + only Fig. 5C | Optical fiber + coating Fig. 6 | Optical fiber buffer portion Fig. 7 |
| 1 | 1.34 | 1.67 | 2.22 |
| 2 | 1.56 | 2.10 | 1.89 |
| 3 | 1.23 | 1.78 | 1.78 |
| 4 | 1.78 | 1.45 | 1.98 |
| 5 | 1.88 | 1.77 | 2.34 |
| 6 | 1.59 | 1.90 | 2.18 |
| 7 | 1.47 | 1.73 | 2.04 |
| 8 | 1.66 | 1.82 | 1.69 |
| 9 | 1.74 | 1.99 | 2.00 |
| 10 | 1.37 | 1.89 | 1.92 |
| 11 | 1.56 | 2.01 | 1.86 |
| Maximum | 1.88 | 2.10 | 2.34 |
| Minimum | 1.23 | 1.45 | 1.69 |
| Average | 1.562 | 1.828 | 1.991 |

As shown in the measurement result of FIG. 3, according to a sample shown in FIG. 5C, the average value thereof was 1.562 kgf and the minimum value was 1.23 kgf. According to a sample shown in FIG. 6, the average value thereof was 1.828 kgf and the minimum value was 1.45 kgf, according to a sample shown in FIG. 7, the average value thereof was 1.991 kgf and the minimum value was 1.69 kgf. According to samples shown in FIG. 6 and FIG. 7, the average values were 1.17 times and 1.27 times of that of the sample shown in FIG. 5(C), respectively and the minimum value was 1.18 times and 1.37 times of that of sample shown in FIG. 5(C), respectively. Therefore, the tensile strength was remarkably improved.

Second Embodiment

The optical core wire is fixed by calking in such a manner that the optical fiber is inserted through the ferrule as the fixture to be transformed by applying a compressive force from the outer periphery side of the ferrule toward a center thereof. According to the present embodiment, a length L from a position where the optical fiber is fixed by calking to the front end of the optical fiber is defined within 1 mm. This is why the optical fiber end portion is moved by an oscillation and an impact or the like on a calking portion as a support point when the part is incorporated in the optical communication equipment, so that the variation of the light insertion loss due to this should be prevented.

Figure 9:
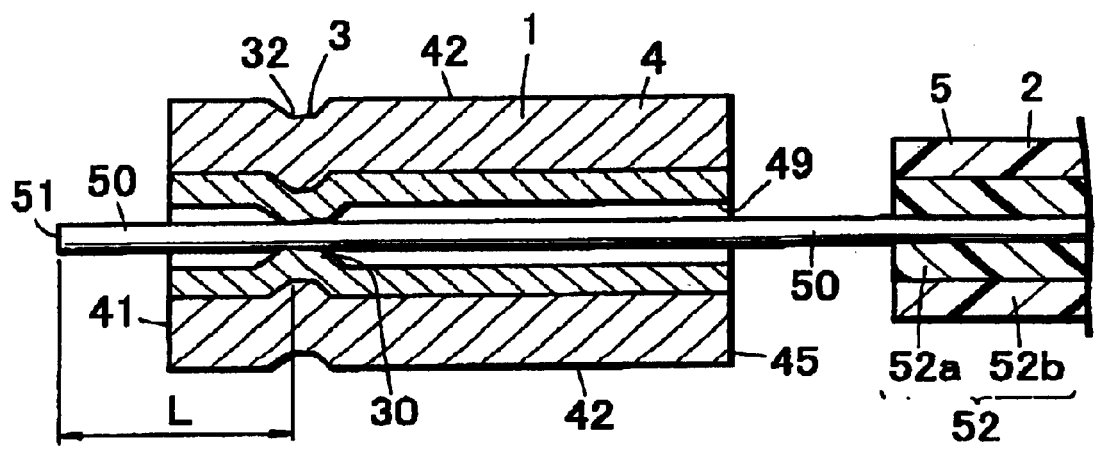
FIG. 9A is a cross sectional view of the optical communication part, in which the optical fiber is fixed by calking to the ferrule according to another embodiment of the present invention.
FIG. 9B is a cross sectional view of the optical communication part, in which the optical fiber is fixed by calking to the ferrule according to another embodiment of the present invention.
Figure 9:
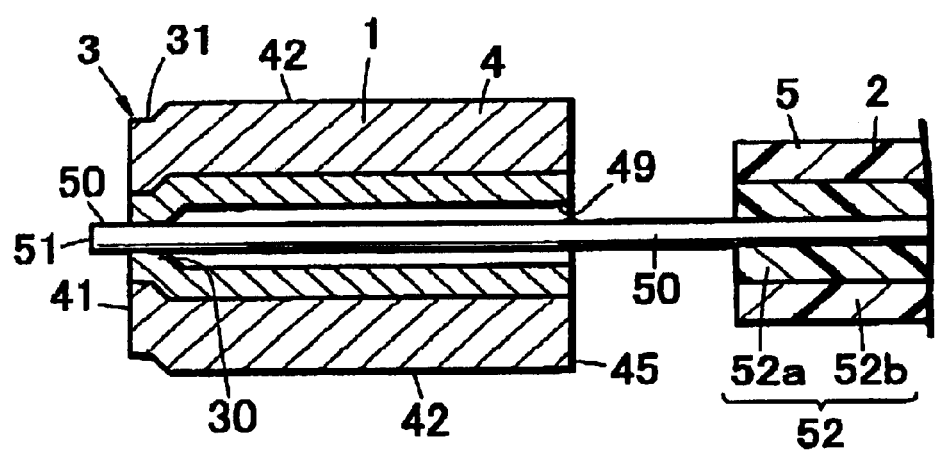

As shown in FIG. 9A, the optical fiber is formally protected by the coated layer 52 and the coated layer 52 is made of first coat 52 a and second coat 52b arranged at the outside of the first coat. However, the coated layer 52 is removed from a portion to be inserted through the ferrule 1, so that the fiber core 50 is exposed. The fiber core 50 is calked so as to form the annular calking groove 32 at an outer periphery portion 42 at the front end portion in the ferrule 4, in which the fiber core 50 is inserted through its hollow portion. Then, the fiber core 60 is fixed in the ferrule 4 by the calking portion 30 and the length from the calking portion 30 to an optical fiber front end face 51 is defined within 1 mm. This length L is preferably shorter. As shown in FIG. 9B, when the calking fixation portion 3 is positioned at a front end 41 of the ferrule 1, the length L may be about 0 mm.

THIRD EXAMPLE

Figure 13:
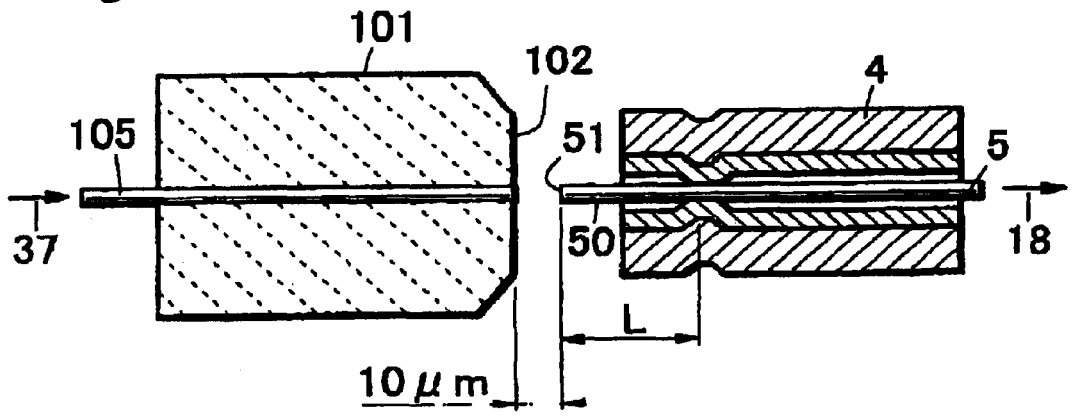
FIG. 13 is a cross sectional view of an apparatus for measuring a transmission loss of the optical fiber.

As shown in FIG. 9A, according to the embodiment of the present invention, the above described optical communication part was made at L=0.5 to 3 mm to be incorporated into the optical equipment shown in FIG. 13, and then, the variation of the insertion loss upon oscillating the equipment was measured. In this optical system, the optical communication part shown in FIG. 9A was arranged in an optical fiber 105, which was fixed by joining to a ceramic ferrule 101 and was connected to a laser source, to assemble a test equipment, and then, a spacing between the optical fiber 5 of the optical communication part and the optical fiber 105 was set to be 10 μm. A light 36 was inputted from the optical fiber 105 and the equipment was adjusted so that the loss of the light 18 received from the optical fiber 4 became the minimum, the oscillation of 20 Hz was provided to the equipment for a minute, and the variation of the loss at this time was measured. This test result is shown in Table 4.

TABLE 4

| No. | Variation of insertion loss dB L | | | |
|---|---|---|---|---|
| | 3 mm | 2 mm | 1 mm | 0.5 mm |
| 1 | 0.20 | 0.20 | 0.15 | 0.04 |
| 2 | 0.35 | 0.19 | 0.12 | 0.03 |
| 3 | 0.10 | 0.20 | 0.08 | 0.07 |
| 4 | 0.25 | 0.24 | 0.09 | 0.05 |
| 5 | 0.28 | 0.18 | 0.12 | 0.08 |
| 6 | 0.45 | 0.15 | 0.09 | 0.10 |
| 7 | 0.34 | 0.21 | 0.07 | 0.05 |
| 8 | 0.30 | 0.32 | 0.09 | 0.08 |
| 9 | 0.30 | 0.27 | 0.13 | 0.09 |
| 10 | 0.38 | 0.25 | 0.14 | 0.07 |
| 11 | 0.32 | 0.22 | 0.07 | 0.05 |
| Maximum | 0.45 | 0.32 | 0.15 | 0.10 |
| Minimum | 0.20 | 0.15 | 0.07 | 0.03 |
| Average | 0.325 | 0.221 | 0.105 | 0.065 |

As shown in Table 4, the variations of the insertion loss in the case of L=3 mm, 2 mm were the maximum value 0.45 dB, 0.32 dB, and the average values are 0.325 dB, 0.221 dB, respectively. On the contrary, the variation of the insertion loss in the case of L=1 mm was the maximum value 0.15 dB, and the average value was 0.105 dB, and further, the variation of the insertion loss in the case of L=0.5 mm was the maximum value 0.10 dB, and the average value was 0.065 dB. As compared to the variation=2 mm, the variations in the case of L=1 mm and the case of L=0.5 mm were less than ⅓. Thus, it was confirmed that the optical communication part having a small variation of the insertion loss was obtained by determining L less than 1 mm.

Figure 10:
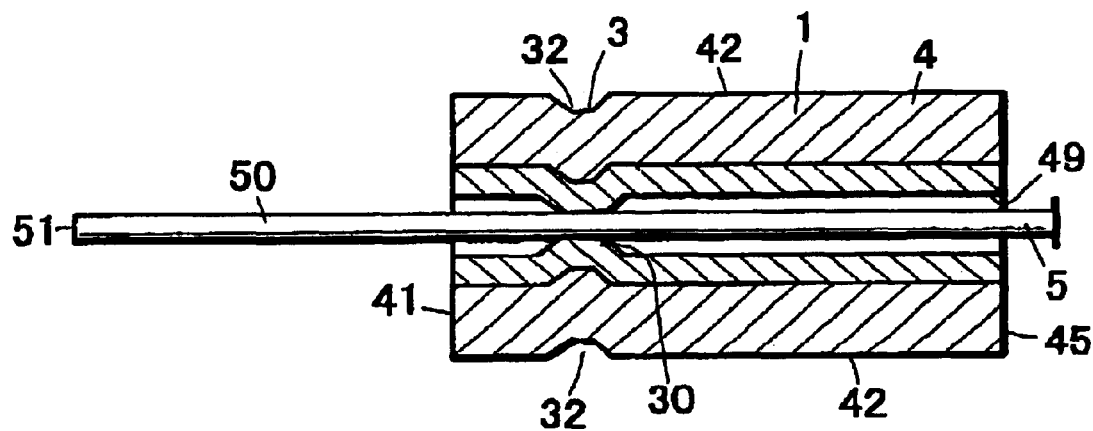
FIG. 10A is a view of an intermediate part, in which the optical fiber is fixed by calking to the ferrule according to another embodiment of the present invention.
FIG. 10B is a cross sectional view of the optical communication part, in which an end face of the ferrule is processed so as to adjust a projection length according to another embodiment of the present invention.
Figure 10:
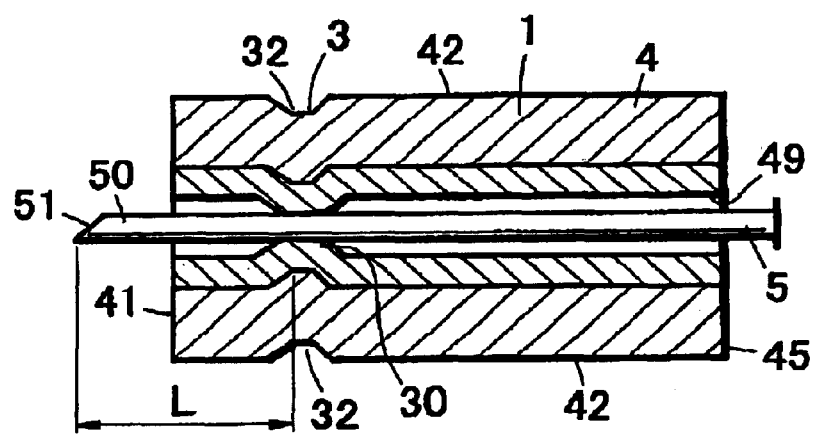

The present embodiment may further include a step for processing an end face of the front end of the foregoing optical fiber after a calking step. In the calking step, the optical fiber is fixed to the ferrule from the ferrule at an appropriate length, and in the processing step, by machining the front end portion, it is possible to adjust the length between the front end face of the optical fiber and the calking portion of the ferrule to be less than 1 mm. As shown in FIG. 10A, the optical fiber 5 is fixed to the ferrule 4 from the ferrule 4 at an appropriate length, and after that, it is also possible to adjust the length L by machining the front end portion into the angled end face 51 as shown in FIG. 10B. In the processing step of the end face, the end face is formed by a mechanical polishing, a supersonic processing and a laser processing.

Figure 11:
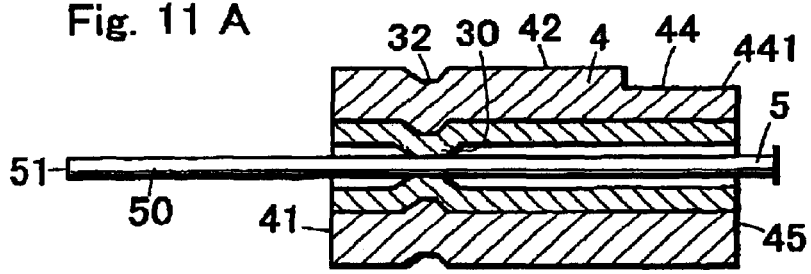
FIGS. 11A and 11B are a cross sectional view and a rear end view, respectively, of the optical communication part, in which a mark is put to the outer periphery of the ferrule.
FIGS. 11C and 11D are cross sectional views of the optical communication part, in which a mark is put to the outer periphery of the ferrule, according to another embodiment of the present invention.
FIG. 11E is a side view of the optical communication part, in which another mark is put to the outer periphery of the ferrule.
FIGS. 11F and 11G are a side view and a top view, respectively, for showing a shape of a front end face of the optical fiber.
Figure 11:
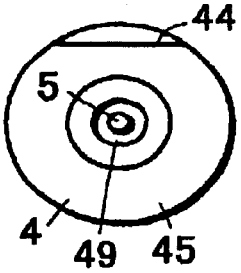
Figure 11:
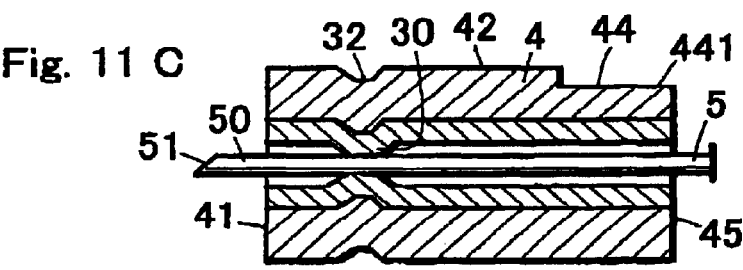
Figure 11:
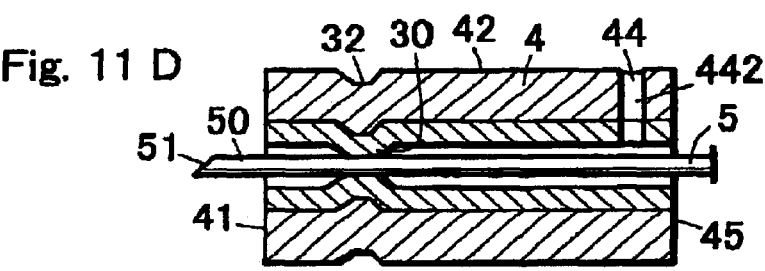
Figure 11:
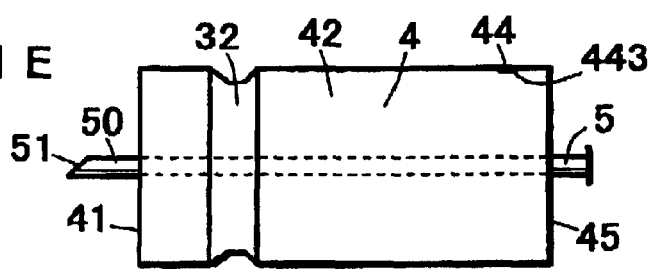
Figure 11:
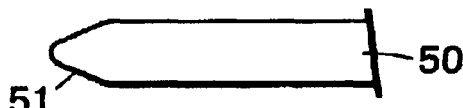
Figure 11:
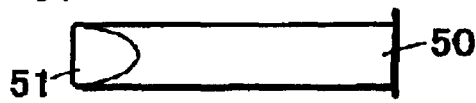

In order to make the end face processing easier, a confirmation mark is applied to the holder (in the present example, the ferrule) in advance. According to the present example, the calking step may include the formation of the front end face of the optical fiber at an arbitrary angle or an arbitrary position with respect to this positioning mark. The positioning mark is used as an indicator for positioning the front end face 51 of the optical fiber 5 upon the calking processing. The front end face 51 of the optical fiber 5 may be shaped in an angled end face having a directional character as shown in FIG. 11C, and further, it may be shaped in a cuneal lens shape as shown in FIG. 11F and FIG. 11G. In order to indicate the position of the front end face 51, it is possible to place a confirmation mark 44 on a portion of a ferrule 9 of the holder 1 as shown in FIG. 11A.

The ferrule is set in the processing jig on the basis of this positioning mark 44, and the front end face 51 of the optical fiber is processed into the angled end face or the cuneal lens shape at a certain angle or a certain position by the mechanical polishing, the supersonic processing and the laser processing.

An example of the positioning mark 44 may include a crena face 441 as shown in FIGS. 11A to 11C, a hole 442 as shown in FIG. 11D, and a fusion trace 443 as shown in FIG. 11E, in which a portion of the surface of the fixture is fused by the irradiation of the laser light.

Figure 12:
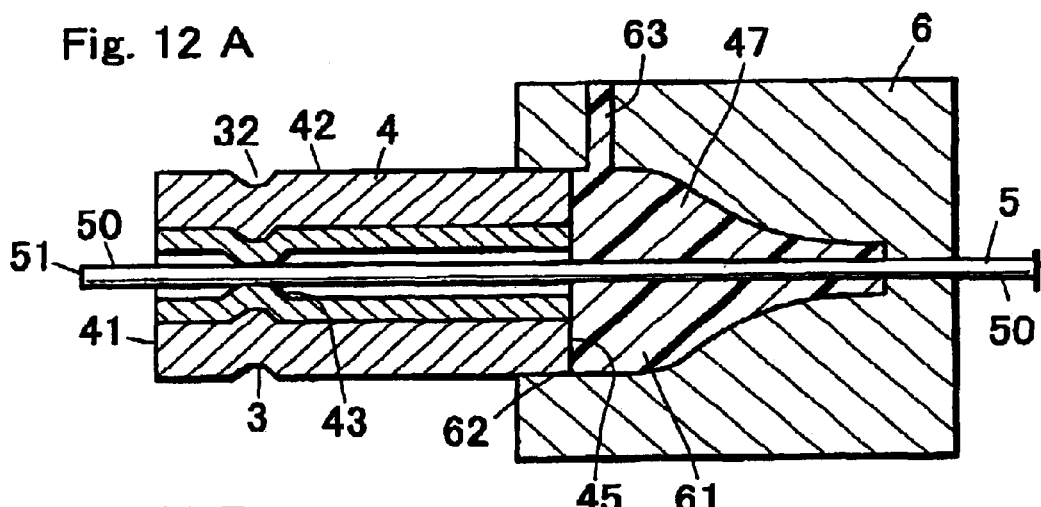
FIG. 12A is a cross sectional view for showing a fabricating method for forming and shaping a protection member made of an elastic body at the rear end portion of the ferrule.
FIG. 12B is a cross sectional view of the optical communication part, which is manufactured by a method shown in FIG. 12A.
Figure 12:
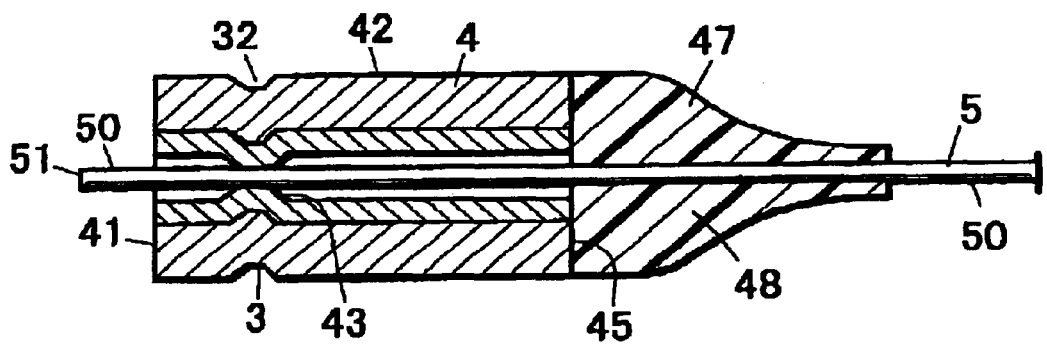

After the calking step, the present example may preferably include a step for integrally forming an optical fiber protection portion at the rear end side of the foregoing holder, which is made of an elastic member to protect the optical fiber. The optical fiber protection portion has an advantage to decrease the load when the optical fiber is bent by the outer force. As such an elastic member, a siliconee resin may be used. FIG. 12A shows a molding step of the optical protection portion. In this step, the rear end portion of the ferrule 4 of the optical communication part shown in FIG. 9A is inserted through an opening portion 62 communicating to a cavity of a mold 6. An adhesive agent to be an elastic body 47 is poured from a hole 63 for inserting the adhesive agent of the mold 6 into a cavity 61. After that, the adhesive agent gets rigid, and then, the mold 6 is disconnected, and the elastic body 47, in which the adhesive agent inserted portion 63 gets rigid, is removed by a cutter or the like, so that it is possible to provide an optical fiber protection portion 48 in a desired shape.

Third Embodiment

According to a fabricating method of the present embodiment, the holder comprises a hollow metal holder body made of a metal and a separate metal buffer layer, which is joined to the holder body through a diffusion layer.

In the case of the optical fiber, in the metal ferrule as the holder, the buffer layer as the metal layer is mounted on the inner surface of the ferrule at the side to which the fiber core is fixed, and at a boundary between this buffer portion and the ferrule body, a diffusion layer only made of a constituent component of the buffer layer and the foregoing metal component of the ferrule, namely, an alloy layer is provided. By providing the diffusion layer and joining a base material and the buffer layer tightly, stable calking may be realized, where there is no separation of the buffer layer upon calking.

The holder body may be formed by at least any one of copper, aluminum, magnesium, or an iron-nickel alloy, an iron-nickel-chrome alloy and an iron-chrome alloy.

The selection of these materials is carried out in order to prevent the optical communication part from being dropped off from the optical communication equipment by conforming the thermal expansion coefficient of the optical communication part to that of the optical communication equipment upon incorporating the optical communication part into the communication equipment. In addition, in the ferrule according to the present embodiment, considering a welding property in the case of directly performing the YAG welding upon incorporating the ferrule into the communication equipment, as the outer peripheral side of the ferrule, the base material may be used as it is. On the other hand, in the case of fixing the ferrule by soldering upon incorporating the optical communication part into the optical communication equipment or the like, a soldering primer is also formed at the outer peripheral side by pressure, so that the solder wettability is capable of being secured.

The buffer layer is made of at least one kind from among gold, silver, copper, tin, lead, zinc, nickel, chrome, koval, stainless steel, aluminum, and magnesium. These materials may be used in various combinations as considering the adjustment of the calking force due to the simultaneous use with the base material of the ferrule 1 and a material cost or the like.

The buffer layer is preferably made of gold. Thus, even if the fiber core is inserted into the hollow portion of the ferrule, the core wire portion is not damaged and stress to the core wire upon calking is capable of being decreased, so that it is possible to secure the more stable tensile strength.

The thickness of the buffer layer is preferably and generally 0.001 to 0.5 mm while the preferable range is different depending on the material and shape of the side to be calked and the material of the buffer layer 46.

Figure 14:
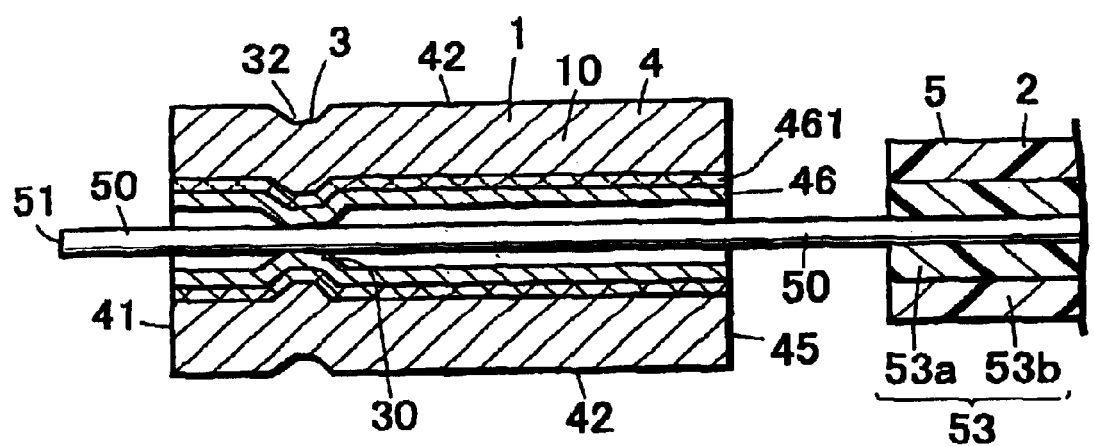
FIG. 14 is a cross sectional view of the optical communication part according to the embodiment of the present invention, in which a metal buffer layer is formed and shaped on an inner surface of the ferrule, to which the optical fiber is fixed by calking.
Figure 15:
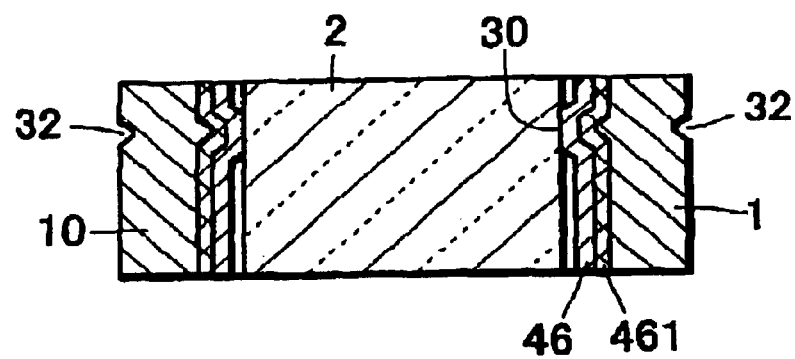
FIG. 15 is a cross sectional view of the optical communication part according to the still another embodiment of the present invention, in which a metal buffer layer is formed and shaped on the inner surface of the ferrule.

FIG. 14 shows an optical communication part as same as the ferrule assembling part of the optical fiber shown in FIG. 9A except for the buffer layer 46 in the inner surface of the ferrule 4 as the holder 1. The optical fiber 5 is inserted through the ferrule 4, a compressive force is applied from the outer peripheral side toward the center thereof, and the annular calking groove 32 is transformed on the outer periphery of the ferrule 4, so that the calking portion 30 at the inner peripheral side of the ferrule 4 fixes the outer face of a fiber core 4 through the buffer layer 46 by pressure. FIG. 15 shows an optical communication part, in which a light polarizer as the optical part 2 is fixed to the ring-shaped metal holder 1, as another example. In the drawing, the buffer layer 46 is formed on the inner surface of a body 10 of the holder 1, and the calking portion which is formed by the calking groove 32 on the outer peripheral face fixes the outer periphery of the lens.

According to these examples, as described above, the diffusion layer, namely, the alloy layer is formed between the buffer layer 46 and the body 10 of the holder 1, so that the buffer layer 46 is solidly joined to the holder 1.

Prior to calking, such a holder may be manufactured by a step for forming a buffer layer by the diffusion joining for joining a metal foil or a metal sheet as the buffer layer to the inner surface of the holder body by pressure. According to the calking step, the optical element is fixed to the holder through this buffer layer. In detail, the step for forming the buffer layer may include joining the metal foil of the buffer layer with the metal foil for the holder body by pressure, forming the buffer layer, which is fixed by the diffusion layer by the diffusion joining, deformed the metal foil forming the buffer layer into a circular cylinder or a tube, and joining a seam. According to the step of forming the buffer layer, after forming the buffer layer, the tube is drawn through a drawing die.

Figure 16:
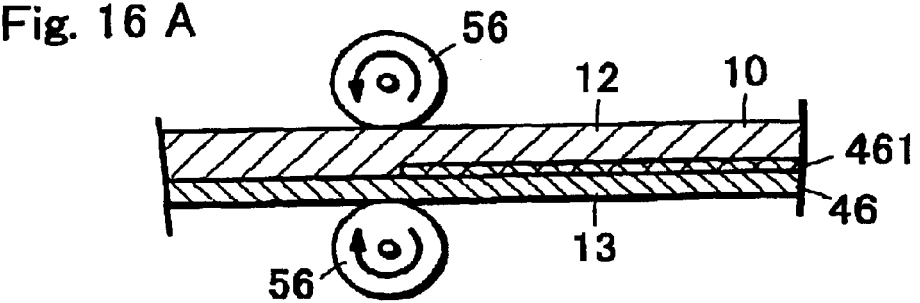
FIGS. 16A to 16D are views for showing a step for forming and shaping a metal buffer layer in the inner surface of the ferrule.
Figure 16:
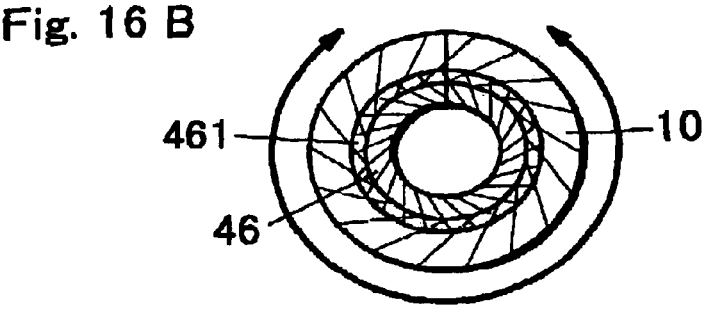
Figure 16:
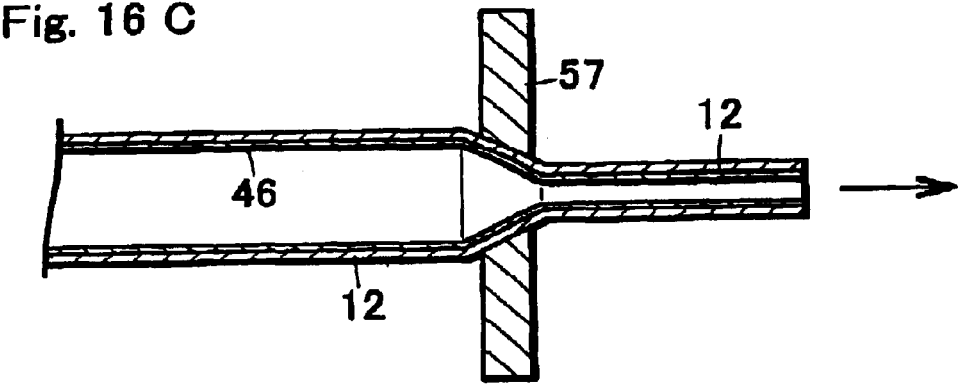
Figure 16:
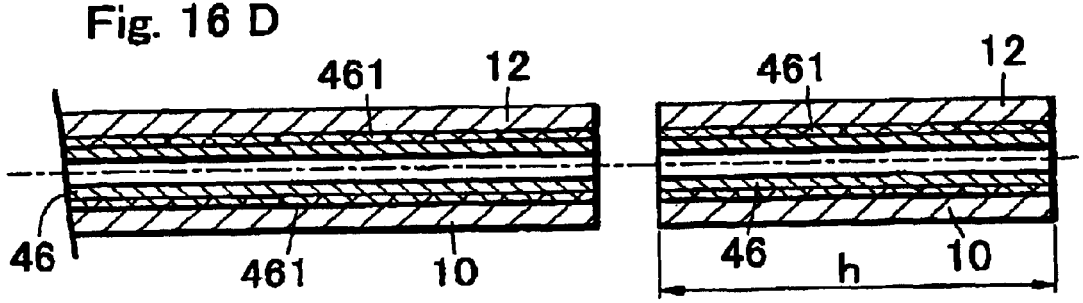

The method of fabricating the holder provided with the buffer layer will be described below with taking a ferrule as an example. As shown in FIG. 16A, a metal foil 13 serving as a buffer layer 46 is mounted on a surface of a metal sheet of a base material 12 for a ferrule, and the metal foil 13 and the metal sheet of a base material 12 are rolled by rolls 56. Then, the buffer layer 46 is fixed on the base material 12, and in this rolling process or a heating process thereafter, a diffusion layer 461 is formed by diffusion joining between the buffer layer and the metal sheet. It is preferred that in the rolling step the base material and the metal foil 13 be heated to a high temperature in order that the interactive diffusion of the base material and the buffer layer 46 may be facilitated. Thus, hot rolling makes the base material and the buffer layer 46 join easier and enables a more strong diffusion layer 461 to be produced.

By changing thickness of either of the base material 12 and the metal foil 13 and an applying pressure, the thickness of either of the ferrule base material 12 and the buffer layer 46 can be freely set, and further, the thickness thereof may be stable. In addition, since the buffer layer 46 can be freely set in a desired thickness, it is possible to freely adjust the stress to the fiber core 4 in the optical fiber and to prevent the fiber core 4 of the optical fiber from breaking. The base material of the ferrule 4 and the buffer layer 46 are joined with each other by a high pressure, and therefore, the strong joining is secured, and the stable calking may be allowed without exfoliation in calking.

A preferable range of this pressure for joining is changed depending on the materials and the thicknesses. Generally, it is preferable that the base material and the buffer layer be reduced with a reduction rate of 20% or more (in other words, the thickness after rolling may be decreased to be less than 80% of both the thicknesses before rolling. Thus, the formation of the diffusion layer may be easily enabled.

In the next place, as shown in FIG. 16B, the base material with the buffer layer is deformed in a cylindrical or tubular form and a seam is welded according to a welding method such as TIG welding and carbon dioxide laser to form a cylindrical base material. In this case, an external diameter of the cylinder, or tube, before a drawing process described later may larger than that of a final product.

A drawing process as shown in FIG. 16C will be carried out in which the cylinder or tube is passed thorough a dice 57 to be drawn down till a desired external diameter thereof is achieved. The dices 57 are changed to gradually lower diameters of a drawing hole to set the desired external diameter of the cylinder. Since the cylinder is deformed by the drawing process with a shape with high dimensional accuracy, this process is preferable for parts requiring high precision such as optics.

After the drawing process, in a cutting process as shown in FIG. 16D, the cylinder is cut into a regular length h to be a ferrule 4. Further, by partially cutting the cylinder, a ferrule 4 is completed.

Fourth Embodiment

According to a fabricating method of the present embodiment, the optical element is the optical fiber and a contact length of the optical fiber in an axial direction at an inner side calking region to which the inner surface of the holder joins the optical fiber with pressure is set to be 0.1 mm or more. Before the calking step, a portion to be calked of the ferrule has a taper shape with an external diameter 0.5 mm or more and with a taper angle of 5 to 60 degrees. Further, the internal diameter thereof is larger than the diameter of the optical fiber and not more than 0.300 mm.

It is preferable that, in such a holder, its outer peripheral portion have a smaller diameter portion which is less by 0.05 mm or more than the external diameter before calking and a stepped portion of the length of the external diameter, namely, a stepped portion having an external diameter of 0.5 mm or more.

In the calking step, a method for calking the holder using an upsetting die having a taper angle that is more than the taper angle of the holder by 0 to 20 degrees may be adopted. According to this method, the die may press the holder at a calking loaded 50 to 300 N while the upsetting die is rotating. When calking the holder, the holder may be held by a support jig that is movable in a flat direction.

FIG. 17A shows that the fiber core 4 is fixed to the ferrule 4 by calking in such a manner that the fiber core 50 of the optical fiber 5 is inserted through the hollow portion of the ferrule 4, a front end portion 43 of the ferrule 4, which is in a taper shape, is pressed in an axial direction by an upsetting die in a taper shape, and the front end portion 43 of the ferrule 4 is deformed toward a center thereof.

FIG. 17B shows an example in which, although the calking-fixture is the same as the configuration shown in FIG. 17A, the coating 53 (two layers 53a and 53b) are inserted through a hollow portion of an extension 451 at the rear end side of the ferrule 4.

According to the present embodiment, a length M of an inner side calking portion 30 for the fiber core 50 of the ferrule 4 is assured by 0.1 mm or more. As shown in FIG. 17A, length M is defined as an axial length of a portion where the inner side calked portion 30 directly is brought in contact with the fiber core 50.

In this case, the fiber core and the ferrule 4 may be preferably provided with the following relation: an external diameter D1 of the ferrule is 0.5 mm or more; an internal diameter D2 of the ferrule is in the range of 0.126 to 0.3 mm; in the ferrule 4, a diameter D3 of the front end face 41 before calking is in the range of 0.2 to 0.8 mm; a taper portion 431 with a taper angle α of 5 to 60 degrees is provided at the outer periphery of the front end portion 43; and a stepped portion 433 having an external diameter D4, which is smaller by 0.05 mm or more than the external diameter D1 and is 0.5 mm or more, is provided so as to be continued to this taper portion 431.

In the configuration of such a ferrule, its external diameter is defined so that the ferrule is capable of bearing the load in the axial direction to be applied in caulking, and since the front end portion 43 of the ferrule 4 is provided with the taper portion 431, the stress dispersion-type calking can be achieved at the front end of the ferrule, not the above described stress concentration-type calking. Therefore, the sufficient calking length L of 0.1 mm or more can be ensured to maintain a high tensile strength in the optical fiber 5.

In the case of further increasing the tensile strength of the optical fiber, by using a method together for calking by using expansion and contraction to be generated by heating the ferrule 4, it is also possible to assure a higher tensile strength.

Even if an excessive load is applied to the ferrule, since the stepped portion 433 is provided and a portion of the stepped portion 433, which is smaller than the external diameter D1, is deformed in advance to absorb the overload, preventing deformation of the external diameter D1. Therefore, the external diameter D1 is not expanded by the overload, and the axial deviation is not generated when incorporating the optical part in communication equipment. In this way, the stepped portion 433 designed for a purpose of preventing deformation of the external diameter D1 due to an overload may be not shaped to be continued to the above described taper portion 431 so that the stepped portion 433 can be arranged at a rear end 45 of the ferrule 4 or a center portion of the ferrule 4.

The calking length L is defined as 0.1 mm or more here, because the tensile strength of 3.5 N and over, namely, at a level having no problem from a practical standpoint can be assured. The calking length L of 0.1 mm or less is not practical since the tensile strength is low, and at the same time, when the internal diameter 6 of the ferrule 4 is scattered due to a very small caulking amount 10, airtightness may be not assured.

The external diameter D1 of the ferrule 4 is preferably 0.5 mm or more. In the case that the diameter D1 of the ferrule 4 is less than 0.5 mm, its straightness is reduced at a calking load 300 N or less and the ferrule 4 is deformed so that it is impossible to incorporate the ferrule 4 into optical equipment.

Further, the taper angle α is preferably 5 to 60 degrees because if the taper angle α is 5 degrees or less, substantially the taper portion 431 is not provided, and in the calking step, the optical fiber 5 is torn, and on the contrary, in the case that the taper angle α is 60 degrees or more, since the taper angle α is too large, the force escapes in the axial direction of the ferrule 4 and it is not possible to assure the sufficient calking amount.

The internal diameter D2 is preferably 0.3 mm or less, it is because that, if the internal diameter D2 is 0.3 mm or more, airtightness with the fiber core 4 may be not assured, and further, if the internal diameter D2 is 0.126 mm or less, the regular external diameter of the fiber core 4 is defined as 0.125 mm and it is not possible to insert the fiber core 4 through the ferrule 4 substantially.

The stepped portion 433 has the external diameter D4, which is smaller than the external diameter D1 by at least 0.05 mm and is 0.5 mm or more. It is because that, if the stepped portion 433 is too narrow, for example, 0.05 mm or less, the ferrule 4 may be bent at the stepped portion 433. In addition, in the case that there is only a step of 0.05 mm or less against the external diameter D1, when the load is applied, the load is not capable of being absorbed at the stepped portion 433, and the external diameter D1 may be expanded.

Figure 18:
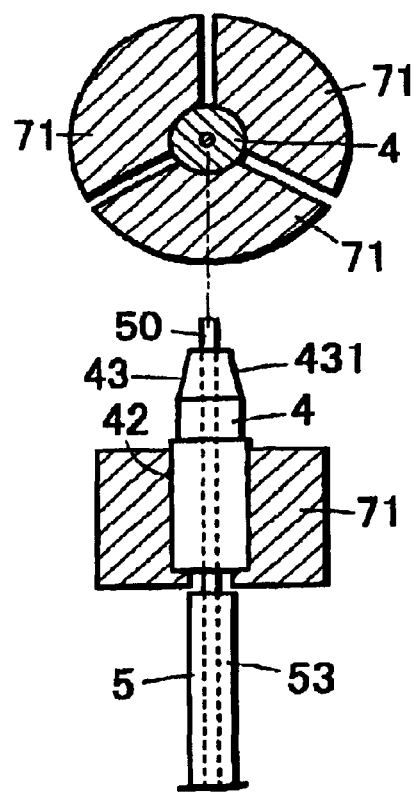
FIGS. 18A to 18D are views for showing a fabricating step of the optical communication part by using the optical fiber according to the another embodiment of the present invention.
Figure 18:
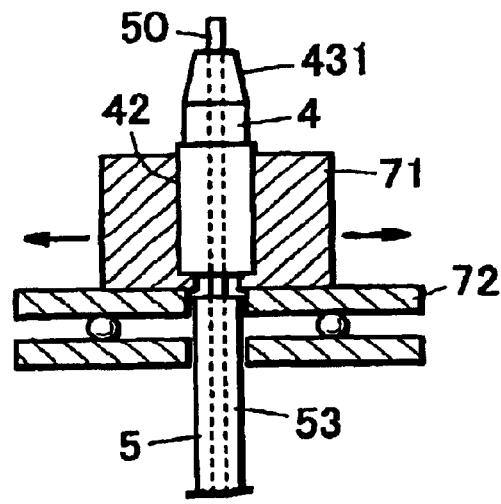
Figure 18:
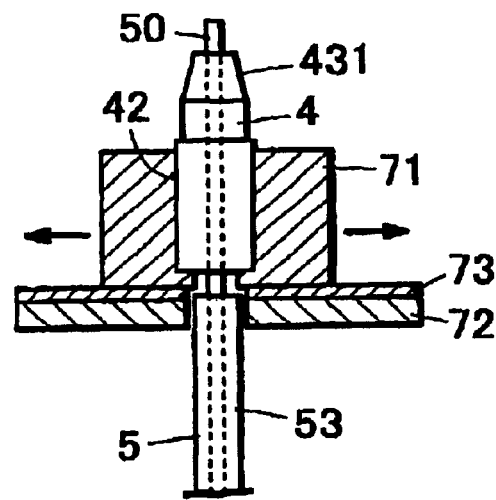
Figure 18:
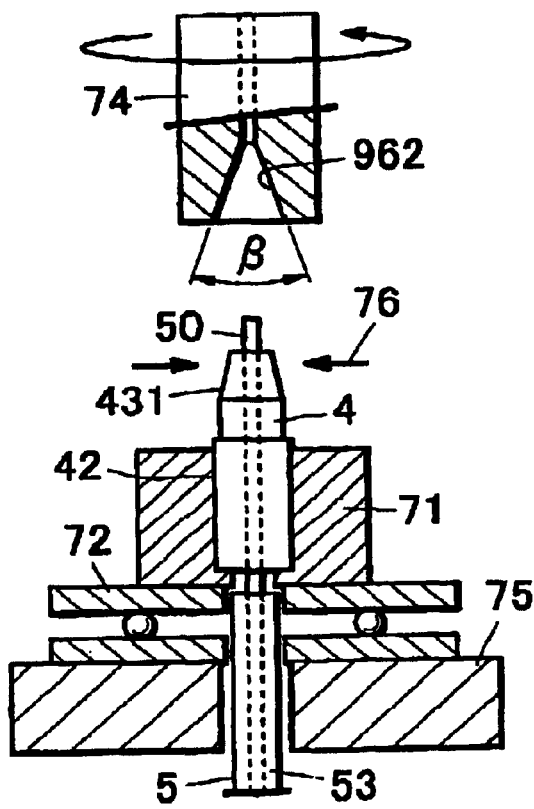
Figure 19:
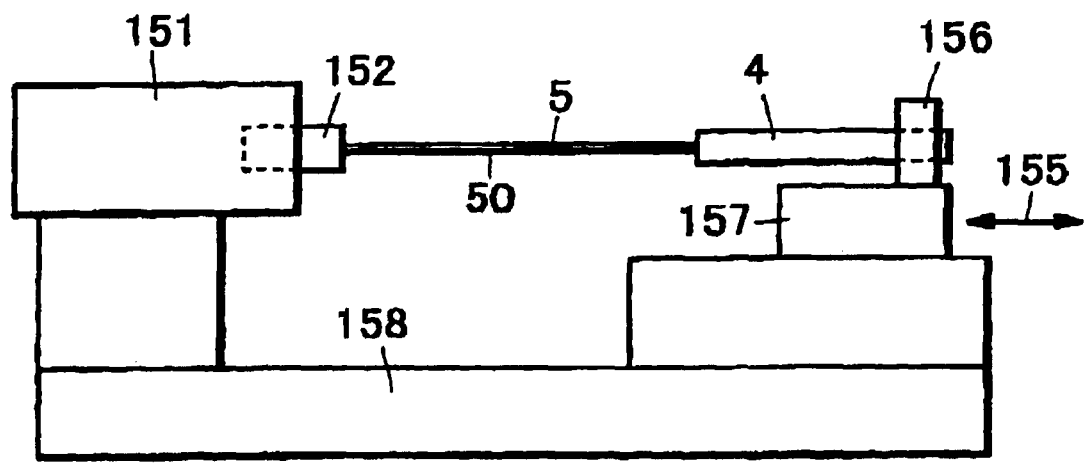
FIG. 19 is a view for schematically showing an apparatus of a tensile strength test of the optical communication part by using the optical fiber.

In the next place, a fabricating method of an optical fiber provided with the above described ferrule will be shown in FIGS. 18A to 18D. At first, as shown in FIG. 18A, the fiber core 50, from which the coated layer 53 is removed, is inserted through the internal diameter of the ferrule 4 till a desired measure is realized to be set to a support jig 71 at the outer periphery portion 42.

Then, on a stage 72 shown in FIG. 18B, on which a bearing or the like is attached, the foregoing support jig 71 is mounted so as to be movable in a flat direction. Due to the moving of the support jig 71 in a flat direction, even if the axis of the ferrule 4 is not matched to the upsetting die 74, it becomes possible that the axis of the ferrule 4 may follow a taper face 962 of the upsetting die 74 in the calking process. The stage 72 used in this case is not limited to a stage provided with a bearing, but a configuration that the support jig may freely move in a flat direction such as a configuration that the support jig 71 moves freely because a Teflon layer membrane 73 is formed above the stage as shown in FIG. 18C and slidability is increased is available.

In the next place, as shown in FIG. 18D, the upsetting die 74 in a taper shape is pushed to the front end of the ferrule 4 with being rotating, and the ferrule 4 is calked by a load in a calking direction 76. In this case, a taper angle β of the upsetting die 74 is larger than a taper angle α of the ferrule 4 by 0 to 20 degrees, and a load of 50 to 30 N is applied as measuring it by a measuring device such as a load cell 15 or the like.

It is because that, in the case that the taper angle β of the upsetting die 74 is larger than the taper angle α of the ferrule 4, it becomes impossible to calking the ferrule 4, and in the case that the taper angle β of the upsetting die 74 is larger than 20 degrees, it becomes impossible to assure the sufficient calking amount.

In addition, by calking the ferrule 4 as rotating the upsetting die 74, it is possible to decrease a friction resistance between the ferrule 4 and the upsetting die 74, so that it becomes possible to deeply sink the front end of the ferrule 4 into the taper face 962 and more calking amount may be saved. In addition, a preferable load is different depending on a material used for the ferrule 4, a front shape of the ferrule and the taper angle β the upsetting die 74. However, for example, in the case that a material of the ferrule 4 is an ASTM-F15, its exterior diameter is 1.0 mm, and a taper angle taper angle α is 30 degrees, a load about 100 N is preferable. In this case, the tensile strength is 10 N and over, namely, in a sufficient level in practice, and aggressiveness to the fiber core 4 should be decreased. Therefore, an excessive load should be avoided.

Fourth Embodiment

According to the following methods, various experiments were carried out.

Figure 22:
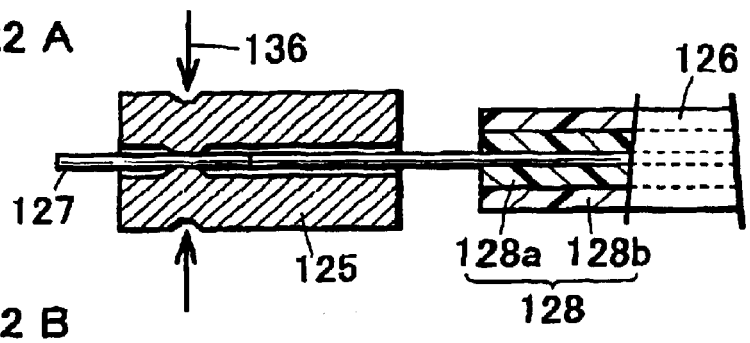
FIGS. 22A to 22D are cross sectional views of conventional methods for fabricating a ferrule to a holder using calking techniques.
Figure 22:
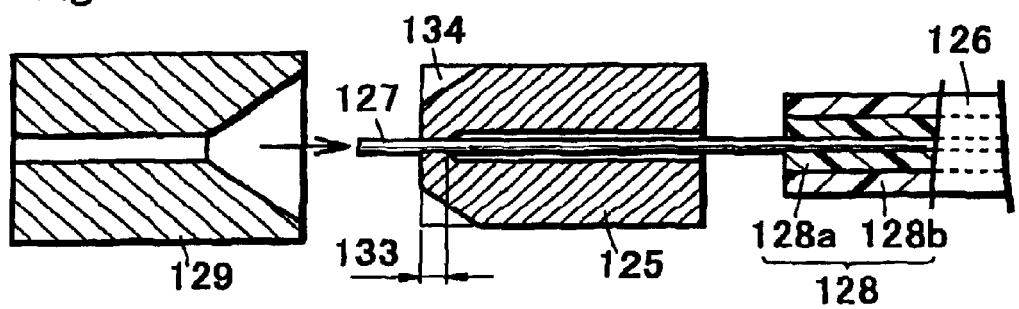
Figure 22:
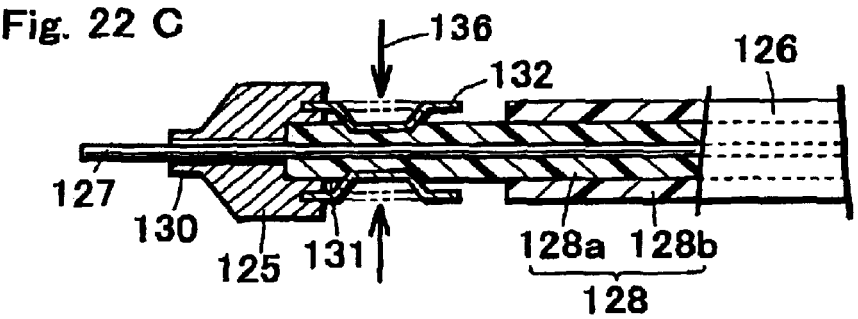
Figure 22:
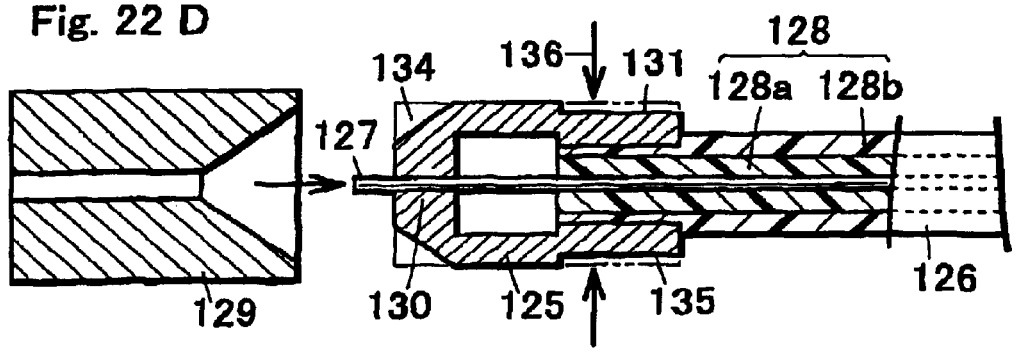

At first, as compared to the above described optical communication part shown in FIG. 17A as the example of the present invention, an optical communication part shown in FIG. 22B was manufactured under each condition, and a relation between each optical fiber tensile strength and a calking amount was measured.

According to the example of the present invention and the conventional example, the external diameter D1 of the ferrule 4 was defined as 1.00 mm, the internal diameter D4 was defined as 0.133 mm, an ASTM-F15 steel was used as a base material, and a leaf gold was applied to the ferrule 4. The taper angle α of the front end of the ferrule 4 according to the example of the present invention was set to be 30 degrees. As the optical fiber 5, a single mode fiber was used for the both sampled, and the upsetting die 74 for calking the ferrule 4 had the taper angle β of 40 degrees. According to the example of the present invention, the upsetting die 74 was rotated, and according to the conventional example, the upsetting die 74 was not rotated upon calking. Further, the load by the upsetting die 74 was in the range of 45 to 305 N. In these conditions, an optical part was manufactured and the tensile strength was measured. The measuring method is shown in FIG. 3.

The optical fiber 5 was fixed to an optical fiber fixing jig 152, which was connected to a push-pull gage 151, the ferrule 4, which was fixed by calking to the foregoing optical fiber 5, was fixed to a ferrule fixing jig, and an operation stage 157, which was installed on a tensile strength measuring device supporting table 158, was slid in a travelling direction 55. In this case, a value of the push-pull gage 51 when an optical fiber 53 was pulled out or it was torn was read and this value was defined as a tensile strength. The evaluation results of these samples are shown in Table 5.

TABLE 5

| Load of upset die (N) | Calking amount (mm) | | Tensile strength (N) | |
|---|---|---|---|---|
| | comparative example | Example invention | Comparative example | Example invention |
| 45 | Not calked | 0.04 | Not calked | 1.93 |
| 50 | 0.03 | 0.10 | 0.88 | 4.20 |
| 75 | 0.05 | 0.28 | 1.15 | 8.50 |
| 100 | 0.08 | 0.55 | 1.55 | 10.20 |
| 200 | Fiber torn | 0.84 | Fiber torn | 12.50 |
| 300 | Fiber torn | 1.05 | Fiber torn | 15.00 |
| 305 | Fiber torn | 0.00 | Fiber torn | 0.00 |

As being obvious from Table 5, according to the example of the present invention, the calking amount was 0.1 mm or more, and the tensile strength 3.5 N and over in a level that there is no problem in practice at the calking amount of 0.1 mm or more was obtained. In addition, it is found that the sufficient calking amount was capable of being assured when the loaded of the upsetting die 74 was in the range of 50 to 300 N. As described above, the calking of the conventional example was the stress concentration-type calking. As a result, the optical fiber 26 was torn before assuring the sufficient calking amount.

In order to evaluate the size of the external diameter D1 of the ferrule 4, the products formed in a shape shown in FIG. 17A and having different external diameters D4 were calking as changing the load of the upsetting die 174, and a transformation amount 44 of the ferrule 4 was measured. A measuring method of the transformation amount was shown in FIG. 20A.

Figure 20:
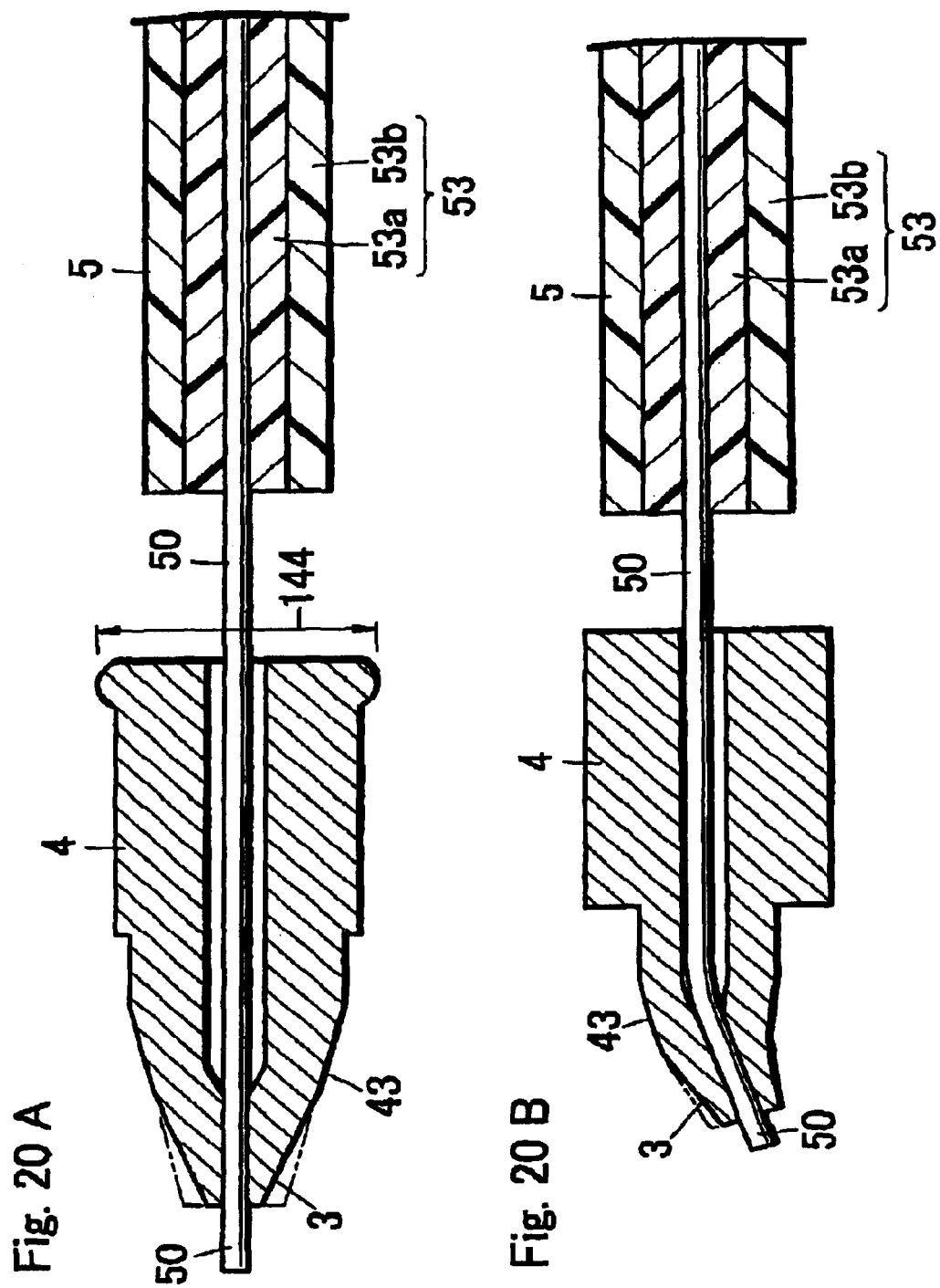
FIGS. 20A and 20B are views for showing modifications of the ferrule after the tensile strength test of the optical communication part including the optical fiber.

FIG. 20A shows that a side where the external diameter of a ferrule 41 is transformed, and a size 144 is measured. In addition, FIG. 20B shows that a side of a front end portion 43 having a narrow external diameter of the ferrule 4 is transformed, and a size 45 ??? is measured.

The evaluation results of these samples are shown in Table 6.

TABLE 6

| | deformation amount of ferrule for each load (mm) | | | | |
|---|---|---|---|---|---|
| External diameter of ferrule (mm) | 0.2 | 0.3 | 0.4 | 0.5 | 0.6 |
| Load (N)  50 | 0.5 | 0.2 | 0 | 0 | 0 |
| 75 | 0.9 | 0.3 | 0 | 0 | 0 |
| 100 | 1.4 | 0.5 | 0 | 0 | 0 |
| 200 | 1.8 | 0.7 | 0.2 | 0 | 0 |
| 300 | 2.3 | 0.9 | 0.4 | 0 | 0 |

As being obvious from Table 6, in the case that the external diameter D1 of the ferrule 4 is 0.5 mm or less, the deformation amount of the ferrule is changed at the load of 300 N or less. In other words, the ferrule 4 was transformed to be easily incorporated into optical equipment, so that the external diameter D1 of the ferrule 4 is preferably 0.5 mm or more.

In addition, in order to evaluate the taper angle α of the front end of the ferrule 41, a product having the taper angle α changed in a shape shown in FIG. 1(a) was calked in the load of 100 N and the calking amount was measured.

The calking amount was measured in such a manner that the ferrule 4 was cut into half after calked and a length of a portion where the ferrule 4 closes to the fiber core 4 was measured by a microscope at a factory. The results are shown in Table 7.

TABLE 7

| | calked amount (mm) | | | | |
|---|---|---|---|---|---|
| Taper angle | 4° | 5° | 30° | 60° | 60.5° |
| Calked amount | Fiber torn | 0.11 | 0.55 | 0.15 | 0.07 |

As being obvious from Table 7, in the case that the taper angle α is 5 degrees or less, there are little or no taper 8. In this case, the calking subjects to the stress concentration-type calking as same as the conventional example shown in FIG. 22A, so that the optical fiber 26 was torn upon calking. On the contrary, in the case that the taper angle α is 60 degrees and over, a force escapes in the axial direction of the ferrule 4, so that it becomes difficult to assure the sufficient calking amount. As a result, the taper angle α is preferably defined as 5 to 60 degrees.

In addition, in order to evaluate the internal diameter 6 of the ferrule 4, a product having the internal diameter D2 of the ferrule 4 changed in a shape shown in FIG. 18A was calked in the load of 100 N for each five and the airtightness with the optical fiber core 4 was measured.

Figure 21:
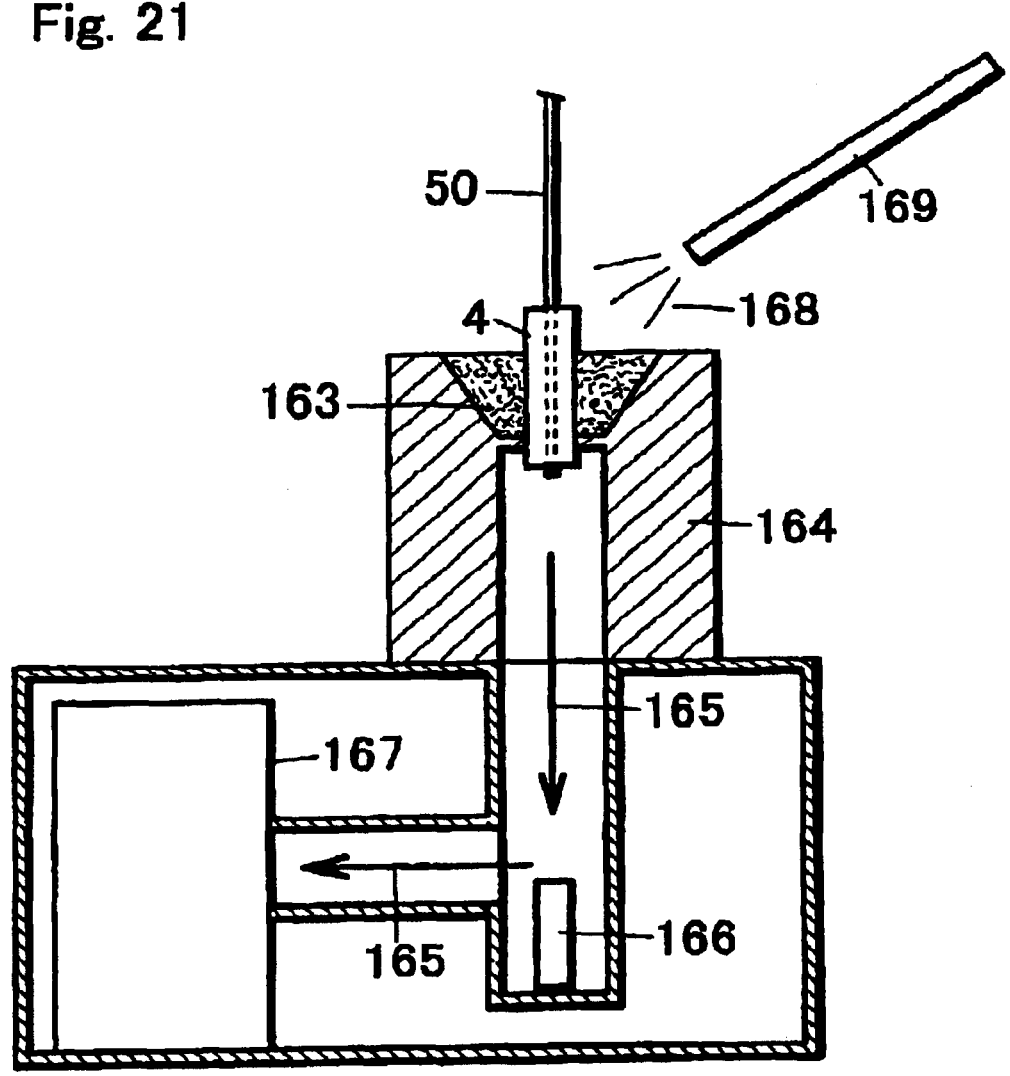
FIG. 21 is a view for showing a ferrule leak test apparatus used in the embodiment of the present invention.

According to this measuring method, as shown in FIG. 21, the ferrule 4, which is fixed by calking to the fiber core 50, is inserted in a silicone rubber 63 filled in an opening portion of a holder 164. Then, as discharging air by a vacuum pump 167, a He gas 68 is emitted toward the rear end portion of the ferrule 4 from a We gas nozzle 169.

In the case that the airtightness in a ferrule 162 is low, the He gas 168 is leaked from the ferrule 4 to be discharged through a flow path 165. In this case, the leak amount is measured by a detector 166. The test results are shown in Table 8.

TABLE 8

| | Airtightness for each interior diameter of ferrule (atm · cc/sec) | | |
|---|---|---|---|
| Interior diameter of ferrule (mm) | 0.126 | 0.300 | 0.32 |
| No. 1 | 1 × 10E-9 | 1 × 10E-8 | 1 × 10E-8 |
| 2 | 1 × 10E-9 | 1 × 10E-8 | 1 × 10E-8 |
| 3 | 1 × 10E-9 | 1 × 10E-8 | 1 × 10E-7 |
| 4 | 1 × 10E-9 | 1 × 10E-8 | 1 × 10E-6 |
| 5 | 1 × 10E-9 | 1 × 10E-8 | 1 × 10E-8 |

As being obvious from the Table 8, in the case that the internal diameter D2 is larger than 0.3 mm, the airtightness with the fiber core 4 may not be sometimes assured since the interior diameter D2 is too large. Therefore, the interior diameter D2 is preferably defined as 0.3 mm or less. In addition, the product having the interior diameter D2 of 0.126 mm or less was not evaluated, because the external diameter of the fiber core 4 is 0.125 mm and in the case that the interior diameter is 0.126 mm or less, it is substantially impossible to insert the fiber core 4 through the ferrule 4. In this case, the airtightness was evaluated on the basis of 1×10$^{-8}$ atm·cc/sec.

In order to evaluate a stepped portion 433 of the ferrule 4 shown in FIG. 18A, the external diameter D1 in a shape shown in FIG. 18A was defined as 1.0 mm, the products having different external diameters D4 were calked by a load of 400 N, and the external diameter D1 and the external diameter D4 after calking were measured. This results are shown in Table 9.

TABLE 9

| Diameter (mm) of stepped portion after calking and external diameter | | | | |
|---|---|---|---|---|
| Diameter (mm) of stepped portion before calking | 0.4 | 0.5 | 0.95 | 0.98 |
| difference (mm) from external diameter of fixture | −0.6 | −0.5 | −0.05 | −0.02 |
| Diameter of stepped portion after calking | Bent | 0.52 | 0.97 | 0.98 |
| External diameter after calking | 1 | 1 | 1 | 1.2 |

As being obvious from Table 9, in the case that the external diameter D4 was 0.5 mm or less, the external diameter D4 was too small, so that the ferrule 4 was bent at a portion of the stepped portion 433. On the contrary, in the case that the diameter of the stepped portion before calking was 0.98 mm, namely, a step was only 0.05 mm or less with the external diameter D1, when the load was applied, the load was not cable of being absorbed at the stepped portion 433, so that the external diameter D1 was expanded. As described above, when the stepped portion 433 is provided with the external diameter D4, which is smaller than the external diameter D1 by at least 0.05 mm or more, and is 0.5 mm or more, even if the excessive load is applied, the stepped portion 433 may absorb the load, so that the stable calking becomes possible.

In addition, in order to evaluate the taper angle β of the upsetting die 74 upon calking, in a shape shown in FIG. 18A, the ferrule 4 having the taper angle α of 30 degrees was calked by the upsetting die 74 having a different taper angle β, and then, the calk amount after calking was measured. Its results are shown in Table 10.

TABLE 10

| Taper angle of upset die | 29° | 30° | 40° | 50° | 52° |
|---|---|---|---|---|---|
| difference from taper angle at ferrule | −1° | 0° | 10° | 20° | 22° |
| Calk amount | 0 | 0.2 | 0.55 | 0.1 | 0.05 |

As being obvious from Table 10, in the case that the taper angle β of the upsetting die 74 (29 degrees) is smaller than the taper angle α (30 degrees) of the ferrule 4, the ferrule 4 is not capable of being calked, and on the contrary, in the case that the taper angle β of the upsetting die 74 (52 degrees) is larger than the taper angle α of the ferrule 4 by 20 degrees and over, the taper angle β is too large, so that the sufficient calking amount is not capable of being assured. Accordingly, in order to assure the sufficient calking amount, the upsetting die, which has the taper angle β that is larger than the taper angle α of the ferrule 4 by 0 to 20 degrees, should be used.

What is claimed is:

1. A method of fabricating an optical communication part, in which an optical element is fixed within a hollow holder, comprising the steps of: inserting an optical element in a hollow portion of the holder made of a metal; and calking a periphery of the hollow portion of the holder to fix the optical element in the hollow portion;

wherein, the calking step comprises calking the holder by heating the holder to a temperature higher or cooling the holder to a temperature lower than the operating temperature of the optical communication part depending on whether a thermal expansion coefficient of the holder is, respectively, higher or lower than that of the optical element.

2. The method according to claim 1, wherein the thermal expansion coefficient of the holder is higher than that of the optical element and a heating temperature of the holder in calking is within the range of 85° C. to 95° C.

3. The method according to claim 1, wherein the thermal expansion coefficient of the holder is lower than that of the optical element and a cooling temperature of the holder in calking is within the range of −50° C. to −40° C.

4. The method according to claim 1, wherein a difference between the thermal expansion coefficient of the optical element and that of the holder is within the range of $1 \times 10^{-6}$ to $5 \times 10^{-6}$/K.

5. The method according to claim 1, wherein, in calking, an external periphery of the holder is pressurized in a center direction of the optical element to be deformed.

6. The method according to claim 1, wherein the optical element comprises an optical fiber.

* * * * *